US012212100B2

(12) United States Patent
Zerebilov et al.

(10) Patent No.: US 12,212,100 B2
(45) Date of Patent: Jan. 28, 2025

(54) MINIATURIZED HIGH SPEED CONNECTOR

(71) Applicant: Amphenol Corporation, Wallingford, CT (US)

(72) Inventors: Arkady Y. Zerebilov, Lancaster, PA (US); Michael Rowlands, Milford, MA (US); Theron Ensminger, East Berlin, PA (US); Jeremy Shober, Lititz, PA (US)

(73) Assignee: Amphenol Corporation, Wallingford, CT (US)

( * ) Notice: Subject to any disclaimer, the term of this patent is extended or adjusted under 35 U.S.C. 154(b) by 351 days.

(21) Appl. No.: 17/732,437

(22) Filed: Apr. 28, 2022

(65) Prior Publication Data

US 2022/0352675 A1 Nov. 3, 2022

Related U.S. Application Data

(60) Provisional application No. 63/228,514, filed on Aug. 2, 2021, provisional application No. 63/182,739, filed on Apr. 30, 2021.

(51) Int. Cl.
*H01R 13/6471* (2011.01)
*H01R 4/02* (2006.01)
(Continued)

(52) U.S. Cl.
CPC ....... *H01R 13/6471* (2013.01); *H01R 13/506* (2013.01); *H01R 13/6581* (2013.01);
(Continued)

(58) Field of Classification Search
None
See application file for complete search history.

(56) References Cited

U.S. PATENT DOCUMENTS 5,037,330 A 8/1991 Fulponi et al.
5,066,236 A 11/1991 Broeksteeg
(Continued)

FOREIGN PATENT DOCUMENTS

CN 1681218 A 10/2005
CN 101132094 A 2/2008
(Continued)

OTHER PUBLICATIONS

Chinese Office Action for Chinese Application No. 201880057597.X, mailed Dec. 3, 2021.
(Continued)

*Primary Examiner* — Oscar C Jimenez
(74) *Attorney, Agent, or Firm* — Wolf, Greenfield & Sacks, P.C.

(57) ABSTRACT

A connector for use with high speed signals. The connector may include lead frame assemblies in a connector housing. A lead frame assembly may include signal conductive elements and ground conductive elements disposed in a repeating pattern, and one or more corrugated sheets attached to the ground conductive elements. The corrugated sheets may extend more than half of the length of the signal conductive elements. Valleys of the corrugated sheets may be welded to the ground conductive elements with line welds. The line welds may extend over a large percentage of the length of the conductive elements. Such a configuration enables accurately and repeatedly establishing signal to ground spacing and therefore promotes high signal integrity, even for miniaturized connectors. Such a connector may be used to meet signal integrity requirements in connectors designed for 112 GBps and beyond.

20 Claims, 23 Drawing Sheets

(51) Int. Cl.

| | |
|---|---|
| ***H01R 13/506*** | (2006.01) |
| ***H01R 13/6581*** | (2011.01) |
| ***H01R 13/6597*** | (2011.01) |
| ***H01R 25/00*** | (2006.01) |

(52) U.S. Cl.

CPC ......... *H01R 13/6597* (2013.01); *H01R 4/029* (2013.01); *H01R 25/00* (2013.01)

(56) References Cited

U.S. PATENT DOCUMENTS

| | | | |
|---|---|---|---|
| 5,280,191 | A | 1/1994 | Chang |
| 5,332,397 | A | 7/1994 | Ingalsbe |
| 5,637,015 | A | 6/1997 | Tan et al. |
| 5,797,770 | A | 8/1998 | Davis et al. |
| 5,808,236 | A | 9/1998 | Brezina et al. |
| 5,865,646 | A | 2/1999 | Ortega et al. |
| 5,924,890 | A | 7/1999 | Morin et al. |
| 6,022,239 | A | 2/2000 | Wright |
| 6,215,666 | B1 | 4/2001 | Hileman et al. |
| 6,238,241 | B1 | 5/2001 | Zhu et al. |
| 6,283,786 | B1 | 9/2001 | Margulis et al. |
| 6,489,563 | B1 | 12/2002 | Zhao et al. |
| 6,517,382 | B2 | 2/2003 | Flickinger et al. |
| 6,749,448 | B2 | 6/2004 | Bright et al. |
| 6,776,649 | B2 | 8/2004 | Pape et al. |
| 6,811,326 | B2 | 11/2004 | Keeble et al. |
| 6,816,376 | B2 | 11/2004 | Bright et al. |
| 6,846,115 | B1 | 1/2005 | Shang et al. |
| 6,872,094 | B1 | 3/2005 | Murr et al. |
| 7,070,446 | B2 | 7/2006 | Henry et al. |
| 7,175,444 | B2 | 2/2007 | Lang et al. |
| 7,198,519 | B2 | 4/2007 | Regnier et al. |
| 7,303,438 | B2 | 12/2007 | Dawiedczyk et al. |
| 7,422,483 | B2 | 9/2008 | Avery et al. |
| 7,448,897 | B2 | 11/2008 | Dawiedczyk et al. |
| 7,540,747 | B2 | 6/2009 | Ice et al. |
| 7,575,471 | B2 | 8/2009 | Long |
| 7,585,188 | B2 | 9/2009 | Regnier |
| 7,764,504 | B2 | 7/2010 | Phillips et al. |
| 7,781,294 | B2 | 8/2010 | Mauder et al. |
| 7,806,698 | B2 | 10/2010 | Regnier |
| 7,871,294 | B2 | 1/2011 | Long |
| RE43,427 | E | 5/2012 | Dawiedczyk et al. |
| 8,358,504 | B2 | 1/2013 | McColloch et al. |
| 8,465,320 | B2 | 6/2013 | Long |
| 8,469,738 | B2 | 6/2013 | Long |
| 8,475,210 | B2 | 7/2013 | Wang |
| 8,597,045 | B2 | 12/2013 | Zhu |
| 8,740,644 | B2 | 6/2014 | Long |
| 8,764,464 | B2 | 7/2014 | Buck et al. |
| 8,830,679 | B2 | 9/2014 | Scholeno |
| 8,858,243 | B2 | 10/2014 | Luo et al. |
| 8,870,471 | B2 | 10/2014 | Ito et al. |
| 9,004,942 | B2 | 4/2015 | Paniauqa |
| 9,077,118 | B2 | 7/2015 | Szu et al. |
| 9,118,151 | B2 | 8/2015 | Tran et al. |
| 9,136,634 | B2 | 9/2015 | De Geest et al. |
| 9,210,817 | B2 | 12/2015 | Briant |
| 9,246,262 | B2 | 1/2016 | Brown |
| 9,246,280 | B2 | 1/2016 | Neer |
| 9,276,358 | B2 | 3/2016 | Ista |
| 9,337,585 | B1 | 5/2016 | Yang |
| 9,368,916 | B2 | 6/2016 | Heyvaert et al. |
| 9,389,368 | B1 | 7/2016 | Sharf |
| 9,509,102 | B2 | 11/2016 | Sharf et al. |
| 9,520,680 | B2 | 12/2016 | Hsu et al. |
| 9,653,829 | B2 | 5/2017 | Long |
| 9,668,378 | B2 | 5/2017 | Phillips |
| 9,671,582 | B2 | 6/2017 | Yeh |
| 9,711,901 | B2 | 7/2017 | Scholeno |
| 9,761,974 | B2 | 9/2017 | L'Esperance et al. |
| 9,829,662 | B2 | 11/2017 | Kurashima |
| 9,929,500 | B1 | 3/2018 | Ista |
| 10,020,614 | B1 | 7/2018 | Bucher |
| 10,109,968 | B2 | 10/2018 | Khazen |
| 10,114,182 | B2 | 10/2018 | Zbinden et al. |
| 10,128,627 | B1 | 11/2018 | Kazav |
| 10,153,571 | B2 | 12/2018 | Kachlic |
| 10,243,305 | B1 | 3/2019 | Pan et al. |
| 10,276,995 | B2 | 4/2019 | Little |
| 10,367,283 | B2 | 7/2019 | L'Esperance et al. |
| 10,367,308 | B2 | 7/2019 | Little et al. |
| 10,374,355 | B2 | 8/2019 | Ayzenberg et al. |
| 10,381,767 | B1 | 8/2019 | Milbrand, Jr. et al. |
| 10,446,960 | B2 | 10/2019 | Guy Ritter et al. |
| 10,511,118 | B2 | 12/2019 | Beltran et al. |
| 10,551,580 | B2 | 2/2020 | Regnier et al. |
| 10,555,437 | B2 | 2/2020 | Little |
| 10,588,243 | B2 | 3/2020 | Little et al. |
| 10,651,606 | B2 | 5/2020 | Little |
| 10,680,364 | B2 | 6/2020 | Champion et al. |
| 10,797,417 | B2 | 10/2020 | Scholeno et al. |
| 10,847,930 | B2 | 11/2020 | Ayzenberg et al. |
| 11,050,176 | B2 | 6/2021 | Yang et al. |
| 11,070,006 | B2 | 7/2021 | Gailus et al. |
| 11,101,611 | B2 | 8/2021 | Winey et al. |
| 11,143,830 | B2 | 10/2021 | Luo et al. |
| 11,177,592 | B2 | 11/2021 | Scholeno et al. |
| 11,189,943 | B2 | 11/2021 | Zerebilov et al. |
| 11,271,348 | B1 | 3/2022 | Chen et al. |
| 11,444,404 | B2 | 9/2022 | Si et al. |
| 11,469,553 | B2 | 10/2022 | Johnescu et al. |
| 11,469,554 | B2 | 10/2022 | Ellison et al. |
| 2002/0197043 | A1 | 12/2002 | Hwang |
| 2003/0129876 | A1 | 7/2003 | Hasircoglu |
| 2005/0037655 | A1 | 2/2005 | Henry et al. |
| 2005/0255726 | A1 | 11/2005 | Long |
| 2006/0160429 | A1 | 7/2006 | Dawiedczyk et al. |
| 2006/0249820 | A1 | 11/2006 | Ice et al. |
| 2010/0018738 | A1 | 1/2010 | Chen et al. |
| 2010/0078738 | A1 | 4/2010 | Chambers et al. |
| 2010/0248544 | A1 | 9/2010 | Xu et al. |
| 2011/0034075 | A1 | 2/2011 | Feldman et al. |
| 2011/0081114 | A1 | 4/2011 | Togami |
| 2012/0003848 | A1 | 1/2012 | Casher et al. |
| 2012/0052712 | A1 | 3/2012 | Wang |
| 2012/0058665 | A1 | 3/2012 | Zerebilov |
| 2012/0164860 | A1 | 6/2012 | Wang |
| 2012/0184145 | A1 | 7/2012 | Zeng |
| 2012/0202370 | A1 | 8/2012 | Mulfinger et al. |
| 2013/0012038 | A1 | 1/2013 | Kirk et al. |
| 2013/0034999 | A1 | 2/2013 | Szczesny et al. |
| 2013/0065454 | A1 | 3/2013 | Milbrand Jr. |
| 2013/0084744 | A1 | 4/2013 | Zerebilov et al. |
| 2013/0164970 | A1 | 6/2013 | Regnier et al. |
| 2013/0273781 | A1 | 10/2013 | Buck et al. |
| 2013/0288513 | A1 | 10/2013 | Masubuchi et al. |
| 2014/0035755 | A1 | 2/2014 | Ward |
| 2014/0154912 | A1 | 6/2014 | Hirschy |
| 2014/0193993 | A1 | 7/2014 | Meng |
| 2014/0286613 | A1 | 9/2014 | Ito et al. |
| 2014/0334792 | A1 | 11/2014 | Bragg |
| 2015/0072561 | A1 | 3/2015 | Schmitt et al. |
| 2015/0093083 | A1 | 4/2015 | Tsai et al. |
| 2015/0132990 | A1 | 5/2015 | Nong Chou et al. |
| 2015/0280368 | A1 | 10/2015 | Bucher |
| 2015/0288110 | A1 | 10/2015 | Tanguchi et al. |
| 2016/0004022 | A1 | 1/2016 | Ishii |
| 2016/0054527 | A1 | 2/2016 | Tang et al. |
| 2016/0104990 | A1 | 4/2016 | Laurx et al. |
| 2016/0131859 | A1 | 5/2016 | Ishii et al. |
| 2016/0156133 | A1 | 6/2016 | Masubuchi et al. |
| 2016/0172803 | A1 | 6/2016 | Tamai |
| 2016/0174412 | A1 | 6/2016 | Karaaslan et al. |
| 2016/0211623 | A1 | 7/2016 | Sharf et al. |
| 2016/0315425 | A1 | 10/2016 | Nishimori et al. |
| 2016/0336692 | A1 | 11/2016 | Champion et al. |
| 2017/0054234 | A1 | 2/2017 | Kachlic |
| 2017/0077643 | A1 | 3/2017 | Zbinden et al. |
| 2017/0222374 | A1 | 8/2017 | Saito et al. |
| 2017/0285282 | A1 | 10/2017 | Regnier et al. |
| 2018/0062323 | A1 | 3/2018 | Kirk et al. |
| 2018/0089966 | A1 | 3/2018 | Ward |

(56) References Cited

U.S. PATENT DOCUMENTS

| | | | | |
|---|---|---|---|---|
| 2018/0212385 | A1 | 7/2018 | Little | |
| 2018/0278000 | A1 | 9/2018 | Regnier | |
| 2018/0287280 | A1 | 10/2018 | Ratkovic | |
| 2018/0294592 | A1* | 10/2018 | Huang | H01R 13/6596 |
| 2018/0309214 | A1 | 10/2018 | Lloyd et al. | |
| 2018/0366880 | A1 | 12/2018 | Zerebilov et al. | |
| 2019/0013617 | A1 | 1/2019 | Ayzenberg et al. | |
| 2019/0044284 | A1 | 2/2019 | Dunham | |
| 2019/0115677 | A1 | 4/2019 | Kachlic | |
| 2019/0181582 | A1 | 6/2019 | Beltran et al. | |
| 2019/0191094 | A1 | 6/2019 | Khoe et al. | |
| 2020/0076455 | A1 | 3/2020 | Sharf | |
| 2020/0091637 | A1 | 3/2020 | Scholeno et al. | |
| 2020/0142142 | A1 | 5/2020 | Luo et al. | |
| 2020/0203892 | A1* | 6/2020 | Hsu | H01R 13/6471 |
| 2020/0220289 | A1 | 7/2020 | Scholeno et al. | |
| 2020/0244025 | A1 | 7/2020 | Winey et al. | |
| 2020/0274267 | A1 | 8/2020 | Zerebilov | |
| 2020/0274295 | A1 | 8/2020 | Briant | |
| 2021/0098927 | A1 | 4/2021 | Si et al. | |
| 2021/0234314 | A1 | 7/2021 | Johnescu et al. | |
| 2021/0234315 | A1 | 7/2021 | Ellison et al. | |
| 2021/0351547 | A1* | 11/2021 | Little | H01R 13/6581 |
| 2021/0384691 | A1 | 12/2021 | Winey et al. | |
| 2022/0094111 | A1 | 3/2022 | Duan et al. | |
| 2022/0158371 | A1 | 5/2022 | Zerebilov et al. | |
| 2022/0173550 | A1 | 6/2022 | Liu et al. | |
| 2022/0287205 | A1 | 9/2022 | Huang et al. | |
| 2024/0106140 | A1* | 3/2024 | Xu | H01R 12/727 |

FOREIGN PATENT DOCUMENTS

| | | | |
|---|---|---|---|
| CN | 102106046 | A | 6/2011 |
| CN | 102986091 | A | 3/2013 |
| CN | 103969768 | A | 8/2014 |
| CN | 104518363 | A | 4/2015 |
| CN | 105826740 | A | 8/2016 |
| CN | 108713355 | A | 10/2018 |
| CN | 109273932 | A | 1/2019 |
| CN | 109980386 | A | 7/2019 |
| CN | 210866602 | U | 6/2020 |
| CN | 111555069 | A | 8/2020 |
| CN | 111564723 | A | 8/2020 |
| CN | 211456069 | U | 9/2020 |
| CN | 111769395 | A | 10/2020 |
| CN | 111769396 | A | 10/2020 |
| CN | 112072401 | A | 12/2020 |
| CN | 112086775 | A | 12/2020 |
| CN | 212412345 | U | 1/2021 |
| CN | 213124740 | U | 5/2021 |
| CN | 213151165 | U | 5/2021 |
| CN | 112993659 | A | 6/2021 |
| CN | 113422243 | A | 9/2021 |
| CN | 215184602 | U | 12/2021 |
| EP | 0635912 | A1 | 1/1995 |
| JP | H06-029061 | A | 2/1994 |
| JP | 2004-039635 | A | 2/2004 |
| JP | 2010-266729 | A | 11/2010 |
| JP | 1656986 | S | 4/2020 |
| JP | 1668637 | S | 9/2020 |
| JP | 1668730 | S | 9/2020 |
| KR | 10-2010-0055197 | A | 5/2010 |
| KR | 10-2015-0067010 | A | 6/2015 |
| KR | 10-2015-0101020 | A | 9/2015 |
| KR | 10-2016-0038192 | A | 4/2016 |
| TW | 566712 | U | 12/2003 |
| TW | M388773 | U | 9/2010 |
| TW | M458009 | U | 7/2013 |
| TW | I475754 | B | 3/2015 |
| TW | D209874 | S1 | 2/2021 |
| TW | 202131555 | A | 8/2021 |
| WO | WO 2017/123574 | A1 | 7/2017 |
| WO | WO 2019/000183 | A1 | 1/2019 |
| WO | WO 2021/070273 | A1 | 4/2021 |

OTHER PUBLICATIONS

Chinese Office Action for Chinese Application No. 201880057597.X, mailed Jan. 5, 2021.

Chinese Office Action dated May 10, 2022 in connection with Chinese Application No. 202080016725.3.

Chinese Office Action dated Jun. 9, 2022 in connection with Chinese Application No. 202080019763.4.

Invitation to Pay Additional Fees mailed Jul. 22, 2022 in connection with International Application No. PCT/US2022/026964.

International Preliminary Report on Patentability for International Application No. PCT/US2018/039919 mailed Jan. 16, 2020.

International Search Report and Written Opinion for International Application No. PCT/US2018/039919, dated Nov. 8, 2018.

International Preliminary Report on Patentability mailed Aug. 5, 2021 in connection with International Application No. PCT/US2020/014799.

International Search Report and Written Opinion for International Application No. PCT/US2020/014799, mailed May 27, 2020.

International Preliminary Report on Patentability mailed Aug. 5, 2021 in connection with International Application No. PCT/US2020/014826.

International Search Report and Written Opinion for International Application No. PCT/US2020/014826, mailed May 27, 2020.

International Preliminary Report on Patentability mailed Apr. 7, 2022 in connection with International Application No. PCT/US2020/052397.

International Search Report and Written Opinion for International Application No. PCT/US2020/052397 mailed Jan. 15, 2021.

International Search Report and Written Opinion mailed Mar. 9, 2022 in connection with International Application No. PCT/IB2021/000742.

International Search Report and Written Opinion mailed Jan. 26, 2022 in connection with International Application No. PCT/CN2021/125254.

International Search Report and Written Opinion mailed Oct. 6, 2022 in connection with International Application No. PCT/US2022/026964.

[No Author Listed], INF-8438i Specification for QSFP (Quad Small Formfactor Pluggable) Transceiver. Rev 1.0 Nov. 2006. SFF Committee. 75 pages.

[No Author Listed], INF-8628 Specification for QSFP-DD 8X Transceiver (QSFP Double Density) Rev 0.0 Jun. 27, 2016. SNIA SFF TWG Technology Affiliate. 1 page.

[No Author Listed], SFF-8663 Specification for QSFP+ 28 GB/s Cage (Style A) Rev 1.7. Oct. 19, 2017. SNIA SFF TWG Technology Affiliate. 18 pages.

Palkert (ed), QSFP-DD Overview. Mar. 14, 2017. 19 pages. URL:http://www.qsfp-dd.com.

Si et al., High Performance Stacked Connector, U.S. Appl. No. 17/940,250, filed Sep. 8, 2022.

U.S. Appl. No. 17/160,229, filed Jan. 27, 2021, Zerebilov.

U.S. Appl. No. 17/407,129, filed Aug. 19, 2021, Winey et al.

U.S. Appl. No. 17/535,425, filed Nov. 24, 2021, Zerebilov et al.

U.S. Appl. No. 17/940,250, filed Sep. 8, 2022, Si et al.

U.S. Appl. No. 17/505,437, filed Oct. 19, 2021, Liu et al.

CN 201880057597.X, Dec. 3, 2021, Chinese Office Action.

CN 201880057597.X, Jan. 5, 2021, Chinese Office Action.

CN 202080016725.3, May 10, 2022, Chinese Office Action.

CN 202080019763.4, Jun. 9, 2022, Chinese Office Action.

PCT/CN2021/125254, Jan. 26, 2022, International Search Report and Written Opinion.

PCT/IB2021/000742, Mar. 9, 2022, International Search Report and Written Opinion.

PCT/US2018/039919, Jan. 16, 2020, International Preliminary Report on Patentability.

PCT/US2018/039919, Nov. 8, 2018, International Search Report and Written Opinion.

PCT/US2020/014799, Aug. 5, 2021, International Preliminary Report on Patentability.

PCT/US2020/014799, May 27, 2020, International Search Report and Written Opinion.

(56) References Cited

OTHER PUBLICATIONS

PCT/US2020/014826, Aug. 5, 2021, International Preliminary Report on Patentability.
PCT/US2020/014826, May 27, 2020, International Search Report and Written Opinion.
PCT/US2020/052397, Apr. 7, 2022, International Preliminary Report on Patentability.
PCT/US2020/052397, Jan. 15, 2021, International Search Report and Written Opinion.
PCT/US2022/026964, Jul. 22, 2022, Invitation to Pay Additional Fees.
PCT/US2022/026964, Oct. 6, 2022, International Search Report and Written Opinion.
[No Author Listed], Specification for Quad Small Form Factor Pluggable Module 112. QSFP112 Published Specification Rev. 2.0. QSFP112 Multi-Source Agreement. Jan. 22, 2022. 55 pages.

* cited by examiner

1000

MINIATURIZED HIGH SPEED CONNECTOR

RELATED APPLICATIONS

This patent application claims priority to and the benefit of: U.S. Provisional Patent Application Ser. No. 63/182,739, filed on Apr. 30, 2021 and entitled "MINIATURIZED HIGH SPEED CONNECTOR, High Density Electrical Interconnection," which is hereby incorporated herein by reference in its entirety; and U.S. Provisional Patent Application Ser. No. 63/228,514, filed on Aug. 2, 2021 and entitled "MINIATURIZED HIGH SPEED CONNECTOR," which is hereby incorporated herein by reference in its entirety.

FIELD

This application relates generally to interconnection systems for electronic devices, including electrical connectors and methods of manufacture of electrical connectors.

BACKGROUND

Electrical connectors are used in many electronic systems. It is generally easier and more cost effective to manufacture a system as separate electronic subassemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

A known arrangement for joining several printed circuit boards is to have one printed circuit board serve as a backplane. Other printed circuit boards, called "daughterboards," "daughtercards," or "midboards" may be connected through the backplane. A backplane is a printed circuit board onto which many connectors may be mounted. Conducting traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane. The daughtercards may plug into the backplane at a right angle. The connectors used for these applications may therefore include a right angle bend and are often called "right angle connectors."

Connectors may also be used in other configurations for interconnecting printed circuit boards. Sometimes, one or more smaller printed circuit boards may be connected to another larger printed circuit board. In such a configuration, the larger printed circuit board may be called a "motherboard" and the printed circuit boards connected to it may be called daughterboards. Also, boards of the same size or similar sizes may sometimes be aligned in parallel. Connectors used in these applications are often called "stacking connectors" or "mezzanine connectors."

Connectors may also be used to enable signals to be routed to or from an electronic device. A connector, called an "I/O connector," may be mounted to a printed circuit board, usually at an edge of the printed circuit board. That connector may be configured as a receptacle connector that mates with a plug at one end of a cable assembly, such that cables in the cable assembly are connected to the printed circuit board through the receptacle connector. The other ends of the cables may be connected to another electronic device.

Plugs and I/O receptacle connectors are often constructed according to standards that enable components from different manufacturers to mate. For example, the Quad Small Form-factor Pluggable (QSFP) standard defines a compact, hot-pluggable transceiver used for data communication applications. The form factor and electrical interface are specified by a multi-source agreement (MSA) under the auspices of the Small Form Factor (SFF) Committee. Components made according to the QSFP standard are widely used to interface networking hardware (such as servers and switches) to fiber optic cables or active or passive electrical cable assemblies.

A QSFP plug mates with a receptacle, which is typically mounted on a printed circuit board (PCB). To block electromagnetic interference (EMI), the receptacle may be located within a metal cage also mounted to the PCB. The receptacle is typically located at the back portion of the cage. The front portion of the cage usually extends through a panel of an electronic device and has an opening for receiving the plug. A channel extends from the opening at the front portion of the cage toward the rear portion to guide the plug into engagement with the receptacle.

In some systems, the plug may include a transceiver, which converts signals between the format used within the electronic device containing the receptacle and the format used for transmission over the cables. In some systems, the cables may contain optical fibers for carrying optical signals, and the transceiver may be an optoelectronic transceiver. A transceiver may also be provided for a cable that carries electrical signals, as the signals may be amplified or converted between a signal format used on the cable and a signal format used within a device.

Over time, these standards have evolved to support electronic devices that send or receive larger amounts of data. More recent standards tend to include a larger number of channels passing through the connector than earlier standards. Each channel provides a pathway for a data stream passing to or from the electronic device such that more channels support more streams and support a greater bandwidth, expressed in terms of bits per second of data that may pass into or out of the device through the connector. Often, as more channels are added, the components of the connector are miniaturized so that the overall size of the connector does not increase in proportion to the number of channels added.

An alternative approach to making connectors to support greater bandwidth is to construct the connectors to pass bits at higher frequencies. A connector that passes frequencies up to 30 GHz with relatively low distortion, for example, can pass more bits per second than a connector that can only operate at frequencies up to 15 GHz.

A further approach to enabling connectors to support greater bandwidth is to employ modulation techniques that make better use of available bandwidth. PAM4 is an example of protocol used to provide greater bandwidth.

BRIEF SUMMARY

Aspects of the present disclosure relate to connectors for use with high speed signals.

In one aspect, an electrical connector comprises corrugated metal members welded to ground conductors.

In another aspect, an electrical connector comprises a plurality of lead frame assemblies inserted into a housing.

Two or more of the lead frame assemblies may be held together with a clip. The clip may engage with the housing.

Some embodiments relate to a lead frame assembly. The lead frame assembly may include a lead frame housing; a plurality of conductive elements held by the lead frame housing in a row extending in a row direction, each conductive element comprising a mating contact portion, a mounting portion opposite the mating contact portion, and an intermediate portion extending between the mating contact portion and the mounting portion; and one or more corrugated sheets comprising plateaus and valleys, wherein: the plurality of conductive elements may comprise signal conductive elements and ground conductive elements, and the valleys of the one or more corrugated sheets may be attached to the ground conductive elements.

In some embodiments, the lead frame housing may comprise a portion elongated in the row direction; the one or more corrugated sheets may comprise a first sheet portion disposed adjacent to a first side of the portion of the lead frame housing elongated in the row direction; and a second sheet portion disposed adjacent to a second side of the portion of the lead frame housing elongated in the row direction, the second side being opposite the first side.

In some embodiments, the portion of the lead frame housing elongated in the row may have a width, in a direction perpendicular to the row direction, that may be no more than 50% of the length of the intermediate portions of the conductive elements.

In some embodiments, the lead frame housing may comprise a wider portion extending from the portion elongated in the row, the plurality of conductive elements may comprise conductive elements held by the wider portion of the lead frame housing, and the conductive elements held by the wider portion of the lead frame housing may be configured for power or lower frequency signals than the signal conductive elements.

In some embodiments, for the signal conductive elements, the one or more corrugated sheets may extend along 50% to 99% of the length of the signal conductive elements.

In some embodiments, the signal conductive elements and ground conductive elements may be disposed in a repeating pattern, and the plateaus of the one or more corrugated sheets may be aligned with signal conductive elements between two adjacent ground conductive elements.

In some embodiments, the plateaus of the one or more corrugated sheets may be spaced from respective signal conductive elements by a first distance along a direction perpendicular to the row, centers of the signal conductive elements may be spaced from edges of respective adjacent ground conductive elements by a second distance, and the first distance may be not larger than the second distance.

In some embodiments, the plurality of conductive elements may comprise conductive elements interrupting the repeating pattern.

In some embodiments, the intermediate portions of the conductive elements may each comprise first and second portions separated by a transition region.

In some embodiments, the one or more corrugated sheets may comprise a first corrugated sheet attached to the first portions of the intermediate portions of the ground conductive elements, and a second corrugated sheet attached to the second portions of the intermediate portions of the ground conductive elements.

In some embodiments, the transition regions of the ground conductors may comprise holes extending therethrough.

In some embodiments, the second corrugated sheet may comprise members extending above and between selected mounting portions of the plurality of conductive elements.

In some embodiments, the one or more corrugated sheets may comprise a third corrugated sheet attached to the first portions of the intermediate portions of the ground conductive elements, and the third corrugated sheet may be separated from the first corrugated sheet by a portion of the lead frame housing.

In some embodiments, the third corrugated sheet may comprise members extending above and between selected mating contact portions of the plurality of conductive elements.

In some embodiments, the one or more corrugated sheets may have a thickness less than a thickness of the plurality of conductive elements.

In some embodiments, the one or more corrugated sheets may be made of a material that is less conductive than a material of the plurality of conductive elements.

In some embodiments, the valleys of the one or more corrugated sheets may be attached to the ground conductive elements via welds.

In some embodiments, the welds may cover more than 50% of the length of the valleys.

In some embodiments, the lead frame housing and the one or more corrugated sheets may have complementary features that are engaged, whereby the one or more corrugated sheets may be accurately positioned relative to the plurality of conductive elements.

In some embodiments, the valleys of the one or more corrugated sheets may be attached to the ground conductive elements at line welds, and each line weld may have an aspect ratio of length to width of more than 5:1.

Some embodiments relate to an electrical connector. The electrical connector may include a first lead frame assembly comprising: a first plurality of conductive elements each comprising a mating contact portion, a mounting portion opposite the mating contact portion, and an intermediate portion extending between the mating contact portion and the mounting portion; and a first lead frame housing holding the first plurality of conductive elements in a first row, the first lead frame housing comprising a plurality of first features aligned in a row direction parallel to the first row, the plurality of first features separated from each other by first gaps.

In some embodiments, the electrical connector may include a second lead frame assembly stacked above the first lead frame assembly, the second lead frame assembly comprising: a second plurality of conductive elements each comprising a mating contact portion, a mounting portion opposite the mating contact portion, and an intermediate portion extending between the mating contact portion and the mounting portion; and a second lead frame housing holding the second plurality of conductive elements in a second row, the second lead frame housing comprising a plurality of second features aligned parallel to the row direction and shaped to fit in the first gaps of the first lead frame housing such that the second lead frame assembly cannot move in the row direction with respect to the first lead frame assembly.

In some embodiments, the first lead frame housing of the first lead frame assembly may comprise a third feature on a side of the first lead frame housing, the second lead frame housing of the second lead frame assembly may comprise a fourth feature on a side of the second lead frame housing, and the third feature of the first lead frame housing and the fourth feature of the second lead frame housing may be shaped to interlock such that the second lead frame assembly cannot move, with respect to the first lead frame assembly, in a longitudinal direction perpendicular to the row direction.

In some embodiments, the second lead frame housing of the second lead frame assembly may comprise latching features, and the electrical connector may comprise a connector housing comprising latching features inside the connector housing to engage with the latching features of the second lead frame housing of the second lead frame assembly such that the second lead frame assembly cannot move, with respect to the first lead frame assembly, in a transitional direction perpendicular to the row direction.

In some embodiments, the first lead frame assembly may comprise one or more first corrugated sheets comprising plateaus and valleys, the valleys of the one or more first corrugated sheets attached to selected conductive elements of the first plurality, the second lead frame assembly may comprise one or more second corrugated sheets comprising plateaus and valleys, the valleys of the one or more second corrugated sheets attached to selected conductive elements of the second plurality, and the one or more second corrugated sheets may be separated from the one or more first corrugate sheets by the first and second pluralities of conductive elements.

In some embodiments, the electrical connector may include a third lead frame assembly stacked above the second lead frame assembly, the third lead frame assembly comprising: a third plurality of conductive elements each comprising a mating contact portion, a mounting portion opposite the mating contact portion, and an intermediate portion extending between the mating contact portion and the mounting portion, and a third lead frame housing holding the third plurality of conductive elements in a third row, the third lead frame housing comprising a plurality of fifth features aligned in the row direction, the plurality of fifth features separated from each other by second gaps.

In some embodiments, the electrical connector may include a fourth lead frame assembly stacked above the third lead frame assembly, the fourth lead frame assembly comprising: a fourth plurality of conductive elements each comprising a mating contact portion, a mounting portion opposite the mating contact portion, and an intermediate portion extending between the mating contact portion and the mounting portion, and a fourth lead frame housing holding fourth plurality of conductive elements in a fourth row, the fourth lead frame housing comprising a plurality of sixth features aligned parallel to the row direction and shaped to fit in the second gaps of the third lead frame housing such that the fourth lead frame assembly cannot move in the row direction with respect to the third lead frame assembly.

In some embodiments, the intermediate portions of the fourth plurality of conductive elements each may comprise two or more transition regions separating portions of a respective intermediate portion.

In some embodiments, the fourth lead frame assembly may comprise three or more corrugated sheets each attached to a respective portion of the intermediate portions of the fourth plurality.

In some embodiments, the electrical connector may include a housing comprising: first and second sidewalls opposite each other, a mounting face extending between the first and second sidewalls and exposing the mounting portions of the first, second, third and fourth pluralities of conductive elements, and a mating face extending between the first and second sidewalls, the mating face comprising a first slot exposing the mating contact portions of the first and second pluralities of conductive elements, a second slot exposing the mating contact portions of the third and fourth pluralities of conductive elements, and a region between the first and second slots, the region comprising at least one opening therethrough.

In some embodiments, the electrical connector may include a pair of forks disposed along a diagonal line of the mounting face of the housing.

In some embodiments, the connector housing may comprise a rear end opposite the mating face, and the electrical connector may comprise a shell at the rear end of the connector housing.

In some embodiments, the mounting portions of the first and second pluralities of conductive elements may comprise tails extending in first and second directions opposite to each other, the intermediate portions of the first and second pluralities of the conductive elements may each comprise a portion being closer to a respective mounting portion than a respective mating contact portion, the portions of the intermediate portions of the first plurality of the conductive elements may extend in a first angle to the first direction, the portions of the intermediate portions of the second plurality of the conductive elements may extend in a second angle to the second direction, and the first and second angles may be supplementary.

In some embodiments, the first and second angles may not be right angles.

Some embodiments relate to lead frame assembly. The lead frame assembly may include a lead frame housing comprising a first feature; a plurality of conductive elements held by the lead frame housing in a row, each conductive element comprising a mating contact portion, a mounting portion opposite the mating contact portion, and an intermediate portion extending between the mating contact portion and the mounting portion, the plurality of conductive elements comprising signal conductive elements and ground conductive elements; and a plurality of corrugated sheets comprising plateaus and valleys, the plateaus disposed corresponding to the signal conductive elements of the plurality of conductive elements, the valleys disposed corresponding to the ground conductive elements of the plurality of conductive elements, the plurality of corrugated sheets comprising: a first corrugated sheet disposed between distal ends of the mating contact portions of the plurality of conductive elements and the lead frame housing, and a second corrugated sheet comprising a second feature, the second feature engaged with the first feature of the lead frame housing.

In some embodiments, the first feature and the second feature may be at a central portion of the lead frame housing and a central portion of the second corrugated sheet.

In some embodiments, for the signal conductive elements, the one or more corrugated sheets may extend along 50% to 99% of the length of the signal conductive elements.

In some embodiments, the signal conductive elements and ground conductive elements may be disposed in a repeating pattern, and the plateaus of the one or more corrugated sheets may be aligned with signal conductive elements between two adjacent ground conductive elements.

In some embodiments, the plateaus of the one or more corrugated sheets may be spaced from respective signal conductive elements by a first distance along a direction perpendicular to the row, centers of the signal conductive elements may be spaced from edges of respective adjacent ground conductive elements by a second distance, and the first distance may be not larger than the second distance.

In some embodiments, the plurality of conductive elements may comprise conductive elements interrupting the repeating pattern.

In some embodiments, the intermediate portions of the conductive elements may each comprise first and second portions separated by a transition region, and the first corrugated sheet may be attached to the first portions of the intermediate portions of the ground conductive elements.

In some embodiments, the plurality of corrugated sheets may comprise a third corrugated sheet attached to the second portions of the intermediate portions of the ground conductive elements.

In some embodiments, the transition regions of the ground conductors may comprise holes extending therethrough.

In some embodiments, the third corrugated sheet may comprise members extending above and between selected mounting portions of the plurality of conductive elements.

In some embodiments, the first corrugated sheet may comprise members extending above and between selected mating contact portions of the plurality of conductive elements.

In some embodiments, the one or more corrugated sheets may have a thickness less than a thickness of the plurality of conductive elements.

In some embodiments, the one or more corrugated sheets may be made of a material that is less conductive than a material of the plurality of conductive elements.

In some embodiments, the valleys of the one or more corrugated sheets may be attached to the ground conductive elements with welds.

In some embodiments, the lead frame housing and the plurality of corrugated sheets may have complementary features that may be engaged whereby the one or more corrugated sheets may be accurately positioned relative to the plurality of conductive elements.

In some embodiments, the valleys of the one or more corrugated sheets may be attached to the ground conductive elements at line welds, and each line weld may have an aspect ratio of length to width of more than 5:1.

Some embodiments relate to an electrical connector. The electrical connector may include a first lead frame assembly comprising: a first lead frame housing, a first plurality of conductive elements held by the first lead frame housing in a first row, each conductive element comprising a mating contact portion, a mounting portion opposite the mating contact portion, and an intermediate portion extending between the mating contact portion and the mounting portion, and one or more first corrugated sheets comprising plateaus and valleys, the valleys of the one or more first corrugated sheets attached to selected conductive elements of the first plurality; a second lead frame assembly comprising: a second lead frame housing, and a second plurality of conductive elements held by the second lead frame housing in a second row, each conductive element comprising a mating contact portion, a mounting portion opposite the mating contact portion, and an intermediate portion extending between the mating contact portion and the mounting portion; and a first clip holding the first and second lead frame assemblies such that the second lead frame assembly is stacked on top of the first lead frame assembly and the second plurality of conductive elements in the second row are parallel to the first plurality of conductive element in the first row.

In some embodiments, the clip may comprise latching features, and the electrical connector may comprise a connector housing comprising latching features inside the connector housing to engage with the latching features of the clip.

In some embodiments, the clip may comprise a ring-shaped portion holding the first and second lead frame housings of the first and second lead frame assemblies, and the latching features of the clip may extend from the ring-shape portion.

In some embodiments, the second lead frame assembly may comprise one or more second corrugated sheets comprising plateaus and valleys, the valleys of the one or more second corrugated sheets may be attached to selected conductive elements of the second plurality, and the one or more second corrugated sheets may be separated from the one or more first corrugate sheets by the first and second pluralities of conductive elements.

In some embodiments, the first plurality of conductive elements may comprise signal conductive elements and ground conductive elements, the second plurality of conductive elements may comprise signal conductive elements and ground conductive elements, and the second row may be offset from the first row in a direction that the rows extend such that the ground conductive elements of the first plurality in the first row at least partially overlap with respective signal conductive elements of the second plurality in the second row.

In some embodiments, the electrical connector may include a third lead frame assembly comprising: a third lead frame housing, and a third plurality of conductive elements held by the third lead frame housing in a third row, each conductive element comprising a mating contact portion, a mounting portion opposite the mating contact portion, and an intermediate portion extending between the mating contact portion and the mounting portion; and a member extending between the second lead frame housing and the third lead frame housing such that the third lead frame assembly is stacked on top of the second lead frame assembly.

In some embodiments, the member may comprise one or more forks.

In some embodiments, the electrical connector may include a fourth lead frame assembly comprising: a fourth lead frame housing, and a fourth plurality of conductive elements held by the fourth lead frame housing in a fourth row, each conductive element comprising a mating contact portion, a mounting portion opposite the mating contact portion, and an intermediate portion extending between the mating contact portion and the mounting portion; and a second clip holding the third and fourth lead frame assemblies such that the fourth lead frame assembly is stacked on top of the third lead frame assembly.

In some embodiments, the intermediate portions of the fourth plurality of conductive elements may each comprise two or more transition regions separating portions of a respective intermediate portion.

In some embodiments, the fourth lead frame assembly may comprise three or more corrugated sheets each attached to a respective portion of the intermediate portions of the fourth plurality.

In some embodiments, the electrical connector may include a housing comprising: first and second sidewalls opposite each other, a mounting face extending between the first and second sidewalls and exposing the mounting portions of the first, second, third and fourth pluralities of conductive elements, and a mating face extending between the first and second sidewalls, the mating face comprising a first slot exposing the mating contact portions of the first and second pluralities of conductive elements, a second slot exposing the mating contact portions of the third and fourth pluralities of conductive elements, and a region between the first and second slots, the region comprising at least one opening therethrough.

In some embodiments, the connector housing may comprise a rear end opposite the mating face, and the electrical connector may comprise a shell at the rear end of the connector housing.

In some embodiments, the mounting portions of the first and second pluralities of conductive elements may comprise tails extending in first and second directions opposite to each other, the intermediate portions of the first and second pluralities of the conductive elements may each comprise a portion being closer to a respective mounting portion than a respective mating contact portion, the portions of the intermediate portions of the first plurality of the conductive elements may extend in a first angle to the first direction, the portions of the intermediate portions of the second plurality of the conductive elements may extend in a second angle to the second direction, and the first and second angles may be supplementary.

In some embodiments, the first and second angles may not be right angles.

Some embodiments relate to a method of manufacturing a lead frame assembly. The method may include providing a lead frame comprising a plurality of conductive elements disposed in a row, each conductive element comprising a mating contact portion, a mounting portion opposite the mating contact portion, and an intermediate portion extending between the mating contact portion and the mounting portion; molding an insulative material over first selected regions of the intermediate portions of the plurality of the conductive elements; aligning one or more sheets with second selected regions of the intermediate portions of the plurality of the conductive elements; welding a first area of the one or more sheets to a first conductive element; and welding a second area of the one or more sheets to a second conductive element, wherein the second conductive element is closer to an end of the row than the first conductive element.

In some embodiments, the one or more sheets may comprise plateaus and valleys, and the first area and the second area may be valleys.

In some embodiments, the insulative material may cover no more than 50% of the intermediate portions of signal conductive elements.

In some embodiments, the method may include severing tie bars connecting the one or more sheet.

In some embodiments, the method may include bending the intermediate regions of the plurality of conductive elements such that first and second portions of the plurality of conductive elements are separated by respective inflection points, wherein the second portions extend in an acute or obtuse angle with respect to tails of respective mounting portions.

In some embodiments, the first area of the one or more sheets may be attached to the first conductive element by a line weld along 50% to 99% of a length of the first area.

These techniques may be used alone or in any suitable combination. The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
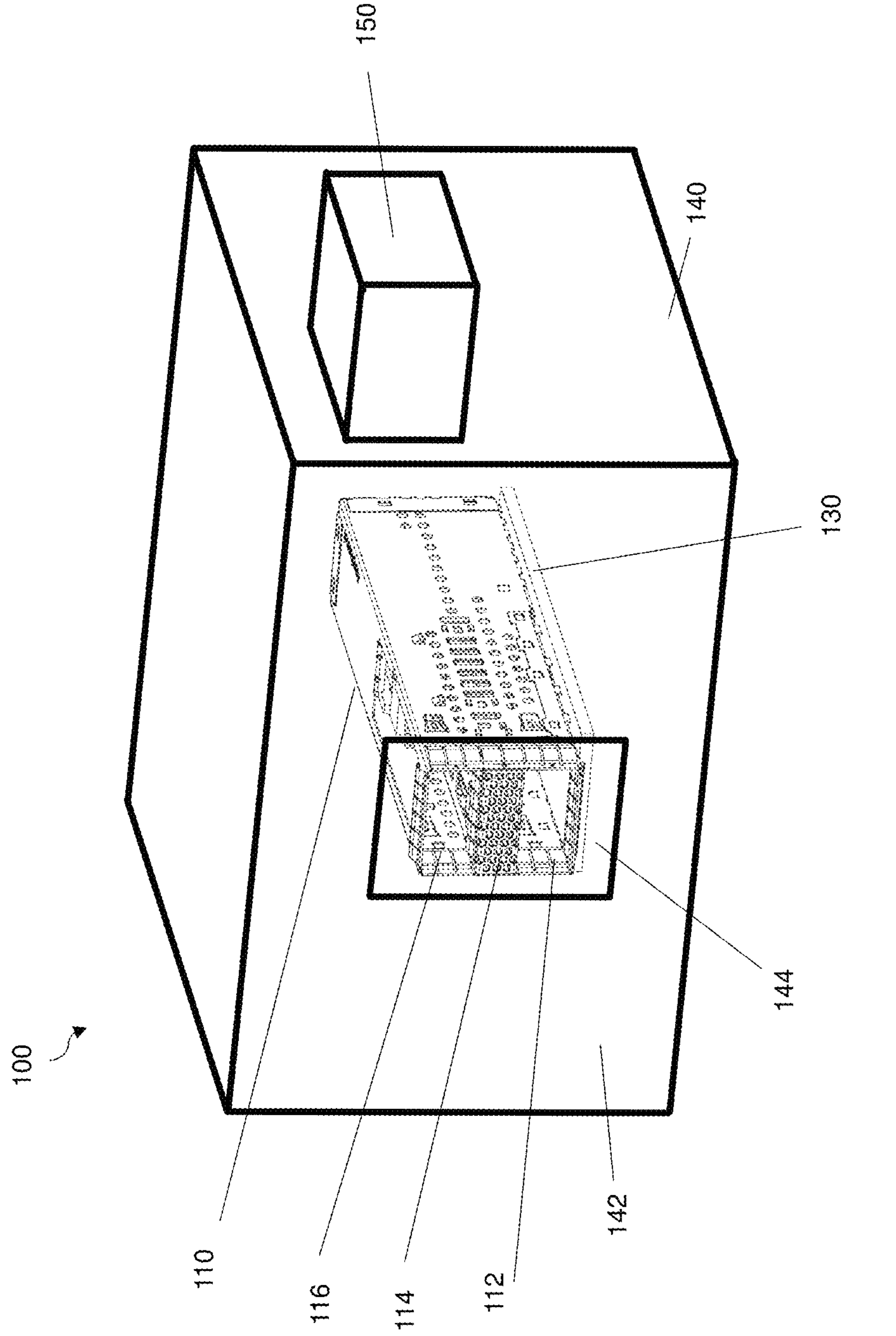
FIG. 1A is a simplified sketch of an electronic device including a stacked I/O connector within a cage, according to some embodiments.

The inventors have recognized and appreciated connector design techniques that satisfy electrical and mechanical requirements to support greater bandwidth through more channels and/or high frequency operation. Some of these techniques may synergistically support both higher frequency connector operation and miniaturization.

In one aspect, an electrical connector may have rows of conductive elements. The conductive elements may each have a mating contact portion, configured for mating with a complementary mating contact portion of a plug or other connector. Each conductive element may also have a tail, configured for mounting the connector to another structure, such as a printed circuit board or a cable. Each conductive element may also have an intermediate portion, joining the mating contact portion and the tail.

Some of the conductive elements in each row may serve as signal conductors and others of the conductive elements may serve as ground conductors. In some embodiments, signal conductors, or pairs of signal conductors, may be interspersed with ground conductors along a row. One or more corrugated sheets may be electrically and mechanically attached to multiple ones of the ground conductors in a row. The corrugated sheets may have plateaus and valleys, with the valleys being attached to the ground conductors. Attachment may be made via laser welding. In some embodiments, the attachment may be via a line weld along greater than 50% of the length of the valley. In some embodiments, the weld may be greater than 60%, 70%, 80% or 90% of the length of the valley. A line weld may have an aspect ratio of length to width of more than 2:1 and, in some embodiments, more than 5:1, more than 10:1 or more than 50:1, for example.

Mechanical attachment, such as via welds, of the corrugated sheets to the conductive elements may provide mechanical rigidity to the lead frame assembly even with relatively small housing portions of the lead frame assemblies. With small housing portions, each signal conductor may be surrounded by air over a relatively large percentage of its length, which may reduce dielectric loss and provide a desired impedance or other desirable properties. The support provided by mechanical attachment of corrugated sheets to ground members may be particularly desirable for high frequency signals where variations in position may lead to variations in impedance, which can degrade the integrity of signals passing through an interconnection system including the connector. Welds, particularly those that extend for a substantial percentage of the length of a conductive element, may provide adequate support.

In some embodiments, the signal conductors may be interspersed with the ground conductors. A corrugated sheet may be positioned with plateaus aligned with the signal conductors.

In embodiments in which the connector is configured for carrying high speed differential signals, the conductive elements may make a repeating Ground-Signal-Signal (G-S-S) pattern or G-S-S-G pattern. In some embodiments, the pattern may be interrupted, such as by conductive elements configured for power or low frequency control signals. In some embodiments, the corrugated sheet may also be interrupted where the repeating pattern of signal and ground conductors is interrupted, such that two or more corrugated sheets collectively span the row. Alternatively or additionally, the corrugated sheet or sheets may be mechanically attached to a lead frame assembly containing the row of conductive elements where the pattern is interrupted.

In some embodiments, each row of conductive elements may be held in an insulative housing, which might be formed in an over molding operation. In an electrical connector, one or more lead frame assemblies may be held together in a housing. One or more corrugated metal sheets may be attached to each lead frame assembly. In some embodiments, the conductive elements in a lead frame assembly may be elongated in a direction orthogonal to the row direction. A single corrugated sheet may span the lead frame assembly in the row direction.

There may be multiple corrugated sheets attached to the ground conductors in a row separated along the elongated direction of the conductive elements. For example, a right angle connector may have one or more inflection points so that the conductive elements bend through an angle that positions the mating interface of the connector at a 90 degree angle with respect to the mounting interface of the connector. In some embodiments, ground conductive elements may have holes at the inflection points, which may enable the use of a smaller force to bend the lead frames that may have wider ground conductive elements than signal conductive elements. The holes may make the conductive elements more likely to stay in position once bent. Separate corrugated sheets may be attached on each side of an inflection point. Additionally, portions of the conductive elements may be covered by insulative portions of the housing of the lead frame and therefore unavailable for attachment of a corrugated sheet. Separate corrugated sheets may be attached on each side of an inflection point. Additionally, mating contact portions of conductive elements may flex, and a separate corrugated sheet may be attached at portions of the intermediate portions of the ground conductors that may be adjacent to the mating contact portions. In some embodiments, the separate corrugated sheet may include portions projecting away from the lead frame housing and towards the mating contact portions of signal conductive elements, which may reduce signal distortions at the mating interface and therefore improve the integrity of the signals passing through, even at high frequencies.

In some embodiments, for example, there may be three corrugated sheets along the length of the conductive elements. In other embodiments, there may be more than three corrugated sheets with separations along the length of the conductive elements. In some embodiments, the multiple corrugated sheets may cover substantially all of the length of the intermediate portions of the conductive elements available for attachment. The sheets may cover at least 60% of the length of the intermediate portions of the conductive elements. In some embodiments, the coverage may be more than 70% or more than 80%, for example.

In some embodiments, even though separate sheets are present in the product, manufacturing techniques may be used to enhance accuracy and repeatability of the alignment of the corrugated sheets along the length of the conductive elements. Ensuring consistent alignment of the corrugated sheets along the length of the conductive elements in a lead frame assembly avoids changes in impedance and other effects that can disrupt signal integrity. In some embodiments, that alignment may be achieved by stamping multiple corrugated sheets from a single sheet of metal. Following stamping, regions of that single metal sheet, which correspond to the separate corrugated sheets in the finished product, may be joined via tie bars. After welding the corrugated sheets to the ground conductors, those tie bars may be removed. In some embodiments, the lead frame assemblies may be constructed with openings that enable a tool to pass through the lead frame assembly in the location of the tie bars, so that the tie bars may be removed. Accordingly, a lead frame assembly may include one or more holes through the lead frame assembly in locations where there is separation between corrugated sheets. Alternatively or additionally, the tie bars may be relatively thin such that they bend, such as when the lead frame assembly is bent into an angle, or flex, such as when the mating contact portions flex. In such embodiments, some or all of the relatively thin tie bars may remain.

Connector construction techniques as described herein also may facilitate accurate relative position in conductive members within an electrical connector, which may contribute to maintaining signal integrity even at high frequency and even for miniaturized connectors where small deviations of components from true position can have a substantial impact on signal integrity. In some embodiments, one or more corrugated sheets in a lead frame assembly may include features that engage with features in a lead frame assembly. The insulative portion of the lead frame assembly, for example, may include positioning features, such as slots into which portions of the corrugated sheets are inserted. When the insulative portions are accurately and repeatedly formed relative to the ground conductors, such as may occur using an insert molding operation, engaging the shield with positioning features of the insulative portions ensures accurate positioning of the corrugated sheets relative to the conductive elements of the lead frame assembly.

Moreover, regardless of the attachment techniques, using corrugated sheets leads to accurate and repeatable signal to ground positioning. A sheet formed through corrugations may have an accurate and repeatable shape.

Using one or more of these techniques may establish signal to ground spacing such that it is accurate and repeatable, which provides high signal integrity even for high frequency signals. The plateaus of the corrugated sheet joining the valleys and the plateau may serve as the nearest ground reference for signal conductors (which could be single signal conductors or differential pairs, for example) between the ground conductors. By accurately forming the corrugations and accurately establishing the attachment locations, the shape of the regions of the corrugated sheet between the ground conductors is established. This accurate positioning accurately and repeatedly establishes the closest ground reference for signal conductors. This ground reference may be established over substantially the length of the conductive elements, contributing to high signal integrity, even at high frequencies.

In some embodiments, the corrugated sheet may have different properties than the conductive elements in an electrical connector. The corrugated sheets, for example, may be thinner than the conductive elements, and/or may have lower conductivity. The corrugated sheets may be less than 0.12 mm, such as 0.1 mm or less, or 0.08 mm or less, in some embodiments. The conductive elements may be at least 10% thicker or at least 20% thicker in some embodiments. The conductivity of the conductive elements, for example, may be at least 5 times the conductivity of the corrugated sheets. In some embodiments, the conductivity may be at least 10 times, 20 times, or 25 times, for example. As a specific example, the corrugated sheet may be 0.08 mm thick, quarter hard 304 stainless steel. Though stainless steel alloy 301 or other alloys may be used in other embodiments.

In some embodiments, accurate relative positioning between rows of conductive elements may be established by clips that hold the two or more lead frame assemblies together and/or position lead frame assemblies relative to a connector housing. Connectors with one or more ports formed with mating portions of conductive elements lining opposing surfaces of an opening in the housing, different lead frame assemblies may be positioned so that the mating portions of different lead frame assemblies line different sides of the opening. These lead frames may be clipped together before insertion into the housing. Using a clip may ensure reliable and repeatable mating forces when a plug is inserted into the port, even for miniaturized connectors that may have thin parts that may tend to yield, and even over a range of operation temperatures over which plastic components of the connector may tend to yield.

In some embodiments, the clips may include features, such as spring fingers that engage the connector housing.

In some embodiments, accurate relative positioning between rows of conductive elements may be established by shaping the lead frame housings to have interlocking features. When the features of the lead frame housings are interlocked, the lead frame assemblies may be reliably positioned relative to each other, even under forces applied in use. Such interlocking features may be used, for example, to establish the relative position of lead frame assemblies with conductive elements with mating portions lining the same slot in a connector housing. The lead frame housings also may include features, such as projections, that engage the connector housing.

Figure 1C:
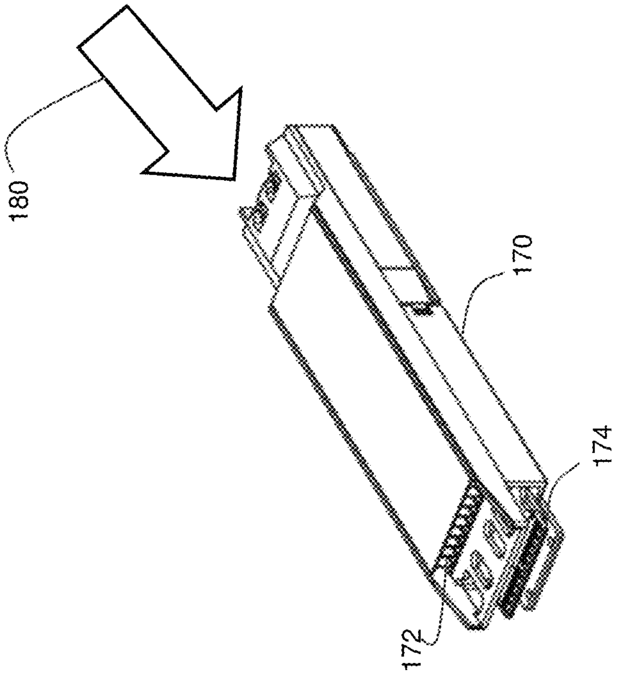
FIG. 1C is a perspective view of a transceiver with integrated heat sink that may be inserted into a channel of cage of FIG. 1B, according to some embodiments.

These techniques may be used in I/O receptacle connectors, which may be used in devices such as switches, routers, servers and other high-performance electronic devices, for example. As shown in FIG. 1A, an electronic system 100 may include an enclosure 140, the enclosure including a panel 142 with at least one opening 144 therethrough. The electronic system 100 may also include a printed circuit board 130 within the enclosure 140. The electronic system 100 may also include a cage 110. The cage 110 may be mounted to the printed circuit board 130 and may enclose a connector mounted to the printed circuit board 130. The electronic system 100 may also include a fan 150. Fan 150, for example, may expel air from the enclosure, thereby causing an airflow 180 (FIG. 1C).

In some embodiments, the cage 110 may be configured to provide shielding from electromagnetic interference. The cage 110 may be formed from any suitable metal or other conductive material and connected to ground for shielding against EMI. The cage 110 may be formed from sheet metal bent into a suitable shape. However, some or all of the components of the cage may be made of other materials, such as die cast metal.

In the example shown in FIG. 1A, the cage 110 may include a first channel 112. The cage 110 may include a second channel 114. The cage 110 may include a third channel 116. In the embodiment illustrated, the second channel 114 is between the first channel 112 and the third channel 116. The first channel 112 may be adjacent the printed circuit board 130. In this example, the first channel 112 and the third channel 116 may each be configured to receive a transceiver, each of which may mate with a connector.

The cage 110 may be bounded by conductive top walls, conductive bottom walls, and/or conductive side walls. These walls and/or partitions internal to cage 110 may form the top and bottom walls of channels. One or more wall pieces may combine to provide shielding around each channel, and the transceivers that may be inserted into them.

According to some embodiments, the fan 150 may be positioned to cause air to flow over or through the cage 110. For example, fan 150 may be positioned to exhaust air from enclosure 140. FIG. 1A shows fan 150 schematically adjacent a wall of enclosure 140, but fan 150 may be positioned in any suitable location. Fan 150, for example, may be positioned inside enclosure 140. In some embodiments, such as in rack mounted electronic devices, I/O connectors may be exposed in a front face of the enclosure, and one or more fans exhaust air from an opposite, rear face of the enclosure. However, it will be appreciated that other suitable locations may create a pressure drop that causes air to flow over components within an electronic enclosure.

In the embodiment illustrated, second channel 114 has a face, exposed within opening 144 with a honeycomb pattern of holes. The holes may enable air to flow into second channel 114 such that air flow through cage 110 may enable dissipation of heat generated by transceivers within channels 112 and 116.

Figure 1B:
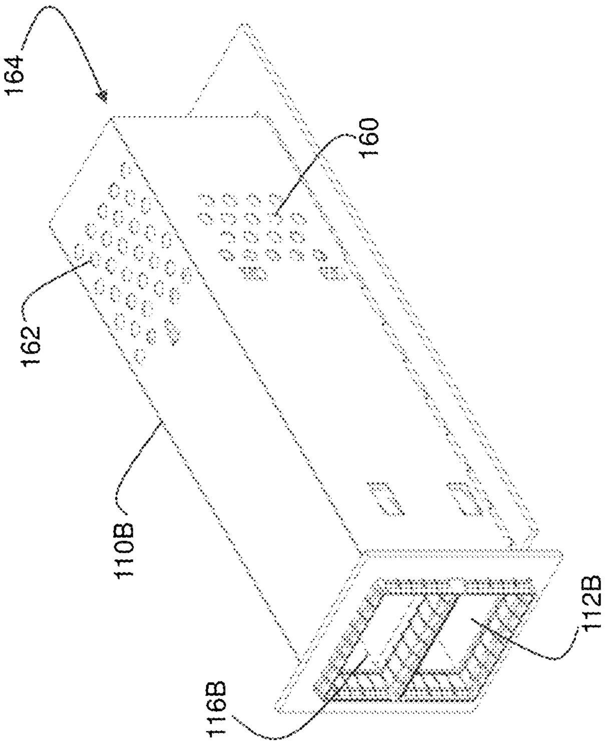
FIG. 1B is a perspective view of an alternative embodiment of a cage for a stacked I/O connector, according to some embodiments.

In some embodiments, a cage may enable airflow to cool transceivers mated with a stacked I/O connector without a middle channel, such as second channel 114. FIG. 1B illustrates such a cage 110B, with channels 112B and 116B, but no middle channels. In this example, cage 110B includes holes 160 in vertical sidewalls of the cage and holes 162 in a top surface of the cage. Similar holes may be included in back face 164, but such holes are not visible in FIG. 1B.

In the example of FIG. 1B, the channels 112B and 116B are sized to receive a transceiver with an integrated heat sink 172. An exemplary transceiver 170 is illustrated in FIG. 1C. Transceiver 170 includes a paddle card 174 that is configured to be inserted into a slot of a receptacle connector inside a cage.

In the embodiment illustrated, heat sink 172 includes multiple fins that extend vertically and parallel to the length of the channel into which it is inserted. Airflow along the elongated dimension of the channel may flow in an airflow direction 180 through and along the fins, carrying away heat. In the embodiment illustrated, heat sink 172 includes a cover plate, but such a cover plate may be absent in some embodiments.

Figure 2A:
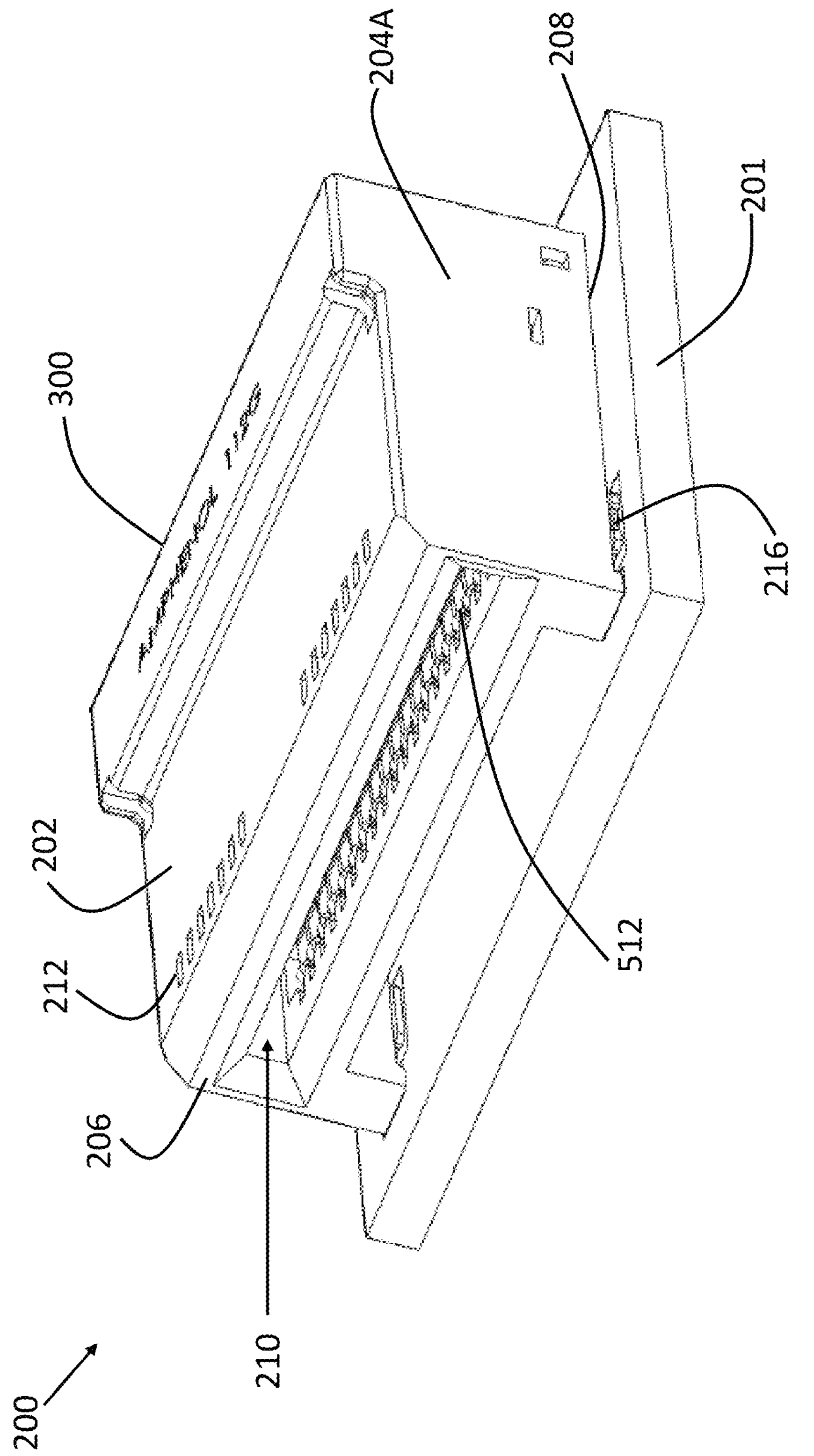
FIG. 2A is a front, side perspective view of an I/O connector, according to some embodiments.
Figure 2B:
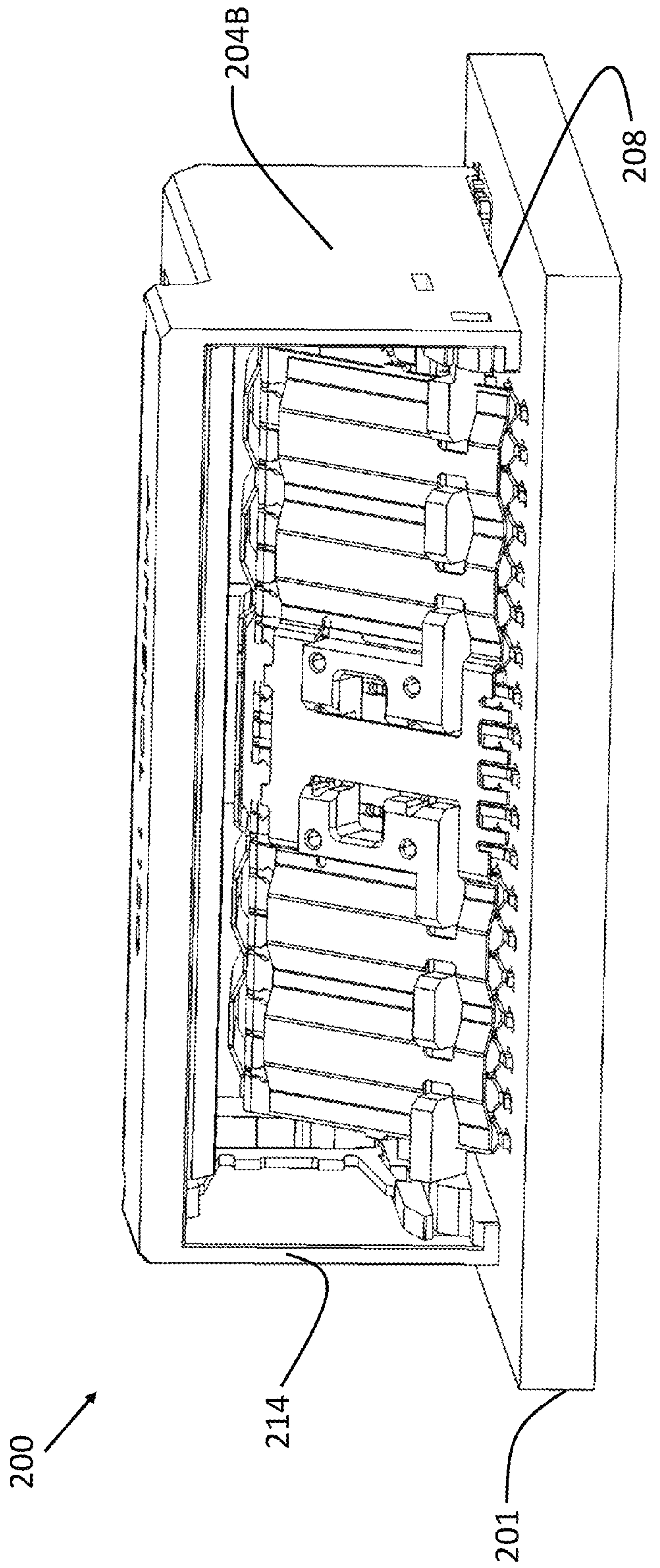
FIG. 2B is a rear, side perspective view of the I/O connector of FIG. 2A, according to some embodiments.
Figure 3:
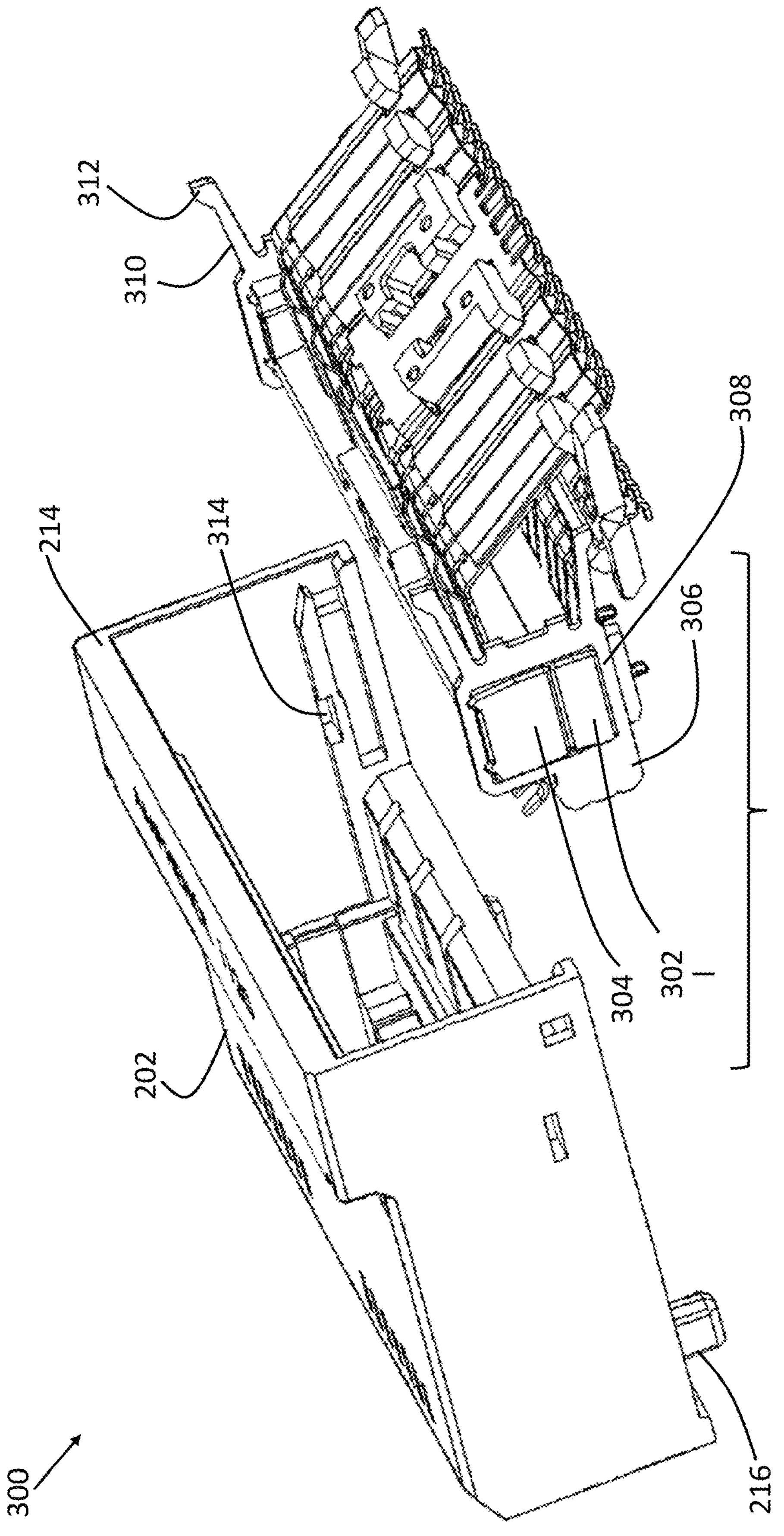
FIG. 3 is a partially exploded view of the I/O connector of FIG. 2A, with lead frame assemblies removed from the housing, according to some embodiments.

An electronic system 200 are illustrated in FIGS. 2A-2B. The electronic system 200 may include an I/O connector 300 mounted to a printed circuit board 201. FIG. 2A shows a front, side perspective view of the I/O connector 300, according to some embodiments. FIG. 2B shows a rear, side perspective view of the I/O connector 300, according to some embodiments. FIG. 3 shows a partially exploded view of the I/O connector 300, with lead frame assemblies 302 and 304 removed from the housing, according to some embodiments.

The connector 300 may include a housing 202 holding the lead frame assemblies 302 and 304. The housing 202 may include sidewalls 204A and 204B opposite each other, and a mounting face 208 extending between the sidewalls 204A and 204B and configured to face the printed circuit board 201. The mounting face 208 may have fastening features 216 configured to enhance the attachment between the connector 300 and the board 201. The housing 202 may include a mating face 206 extending between the sidewalls 204A and 204B. The mating face 206 may extend perpendicular to the mounting face 208. The mating face 206 may include a slot 210, from which mating contact portions 512 of the lead frame assemblies 302 and 304 may be exposed. A card, such as a paddle card of a transceiver or a plug connector, (not shown) may be inserted into the slot 210. The mating portions 512 may establish electrical connections with the card by contacting pads on the card. The housing 202 may have openings 212 for dissipating heat generated at the mating interface. The housing 202 may include a rear end 214 opposite the mating face 206. The rear end 214 may be substantially open.

The connector 300 may include the top lead frame assembly 304 and the bottom lead frame assembly 302. Each lead frame assembly may include conductive elements held in a row by a lead frame housing. The top and bottom lead frame assemblies 302 and 304 may be stacked vertically and held together, such as by clips 306 attached on opposite sides of the lead frame housings. A clip may have a ring-shaped portion 308, into which side portions of the lead frame housings may be inserted. The clips 306 enable the lead frame assemblies 302, 304 to be stacked before inserting into the connector housing. The clips 306 also ensure positional relationship between the assemblies in the mounting direction. Instead of having latching features on the housing, which tends to creep under high temperate, the clips 306 may have latching features. The clips may be metal and may have fingers 310 and tabs 312 extending from the ring-shaped portion 308. The fingers 310 and tabs 312 may be configured to latch onto matching features 314 inside the connector housing 202.

Figure 4B:
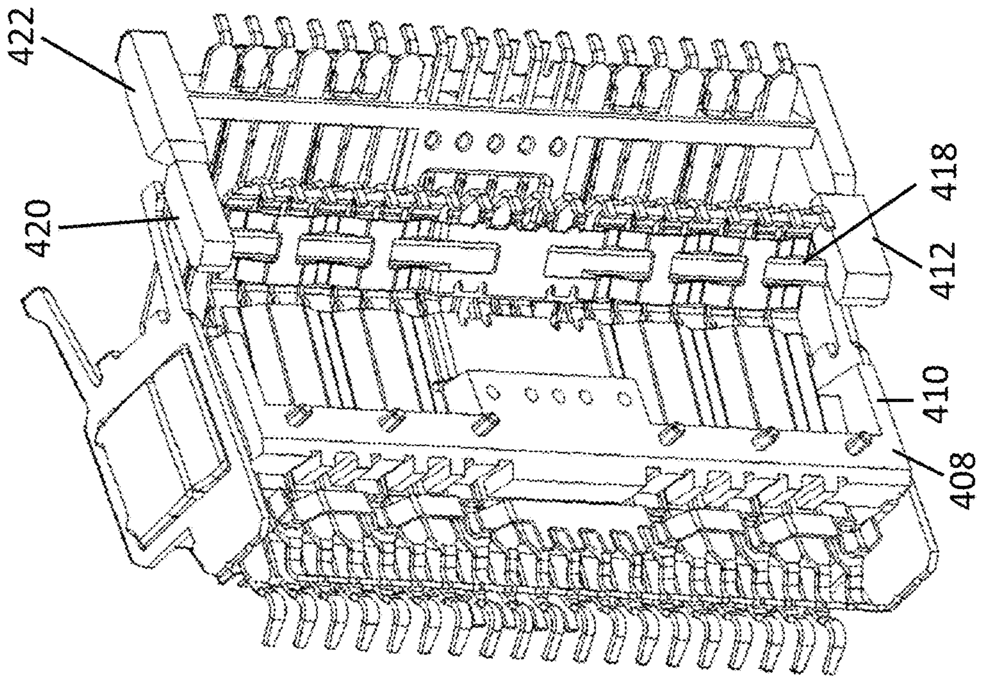
FIG. 4B is a bottom, side perspective view of the lead frame assemblies of FIG. 4A, according to some embodiments.
Figure 4A:
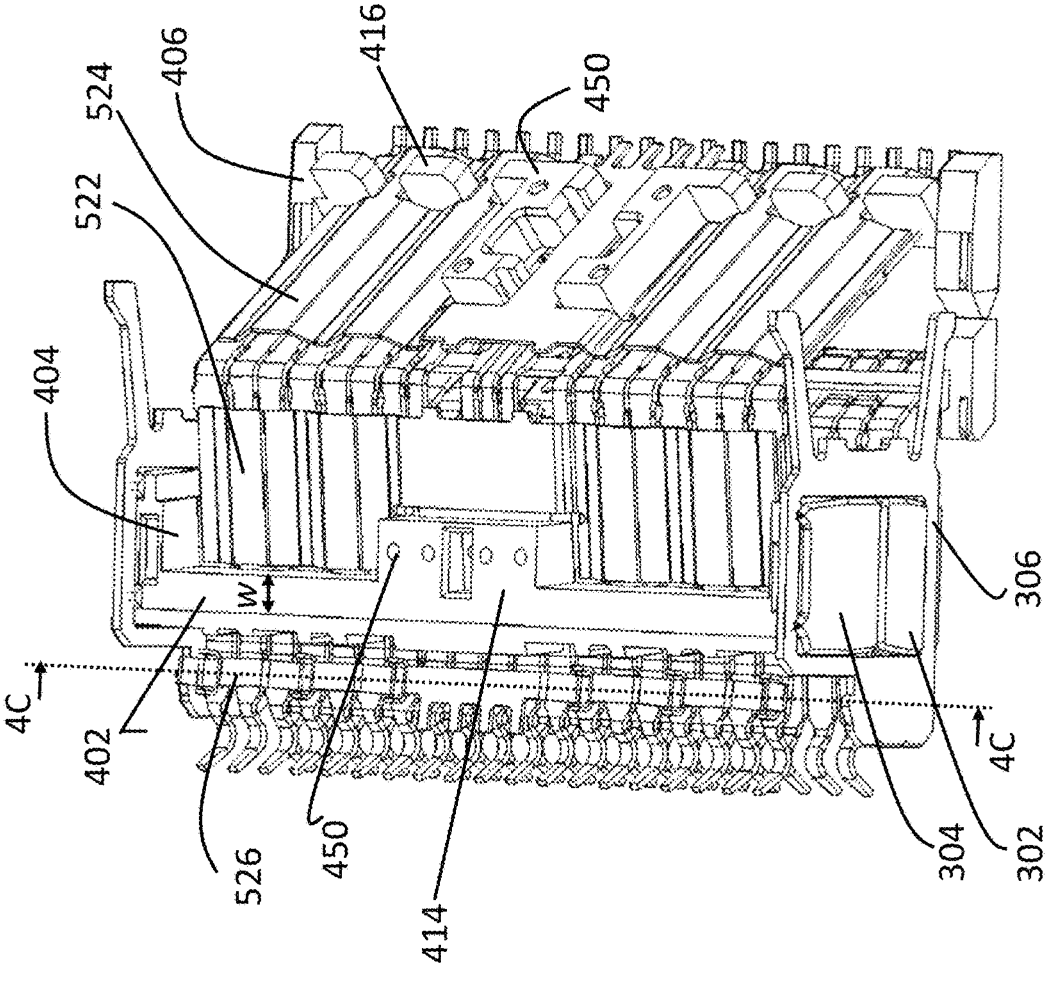
FIG. 4A is a top, side perspective view of the lead frame assemblies of FIG. 3, according to some embodiments.

The lead frame housings of the assemblies may be configured to hold the conductive elements in each assembly in place and also ensure the relative positional relationships between the assemblies when stacked. FIG. 4A shows a top, side perspective view of the lead frame assemblies 302 and 304, according to some embodiments. FIG. 4B shows a bottom, side perspective view of the lead frame assemblies 302 and 304, according to some embodiments. The lead frame housings may have projections 420 and 422 extending substantially parallel to the surface mounting tails. When the top and bottom lead frame assemblies are stacked together, the projections of respective lead frame housing push against each other and ensures the relative positional relationship between the assemblies in the mating direction.

As illustrated, a lead frame housing (e.g., the lead frame housing 402 of the top lead frame 304, the lead frame housing 408 of the bottom lead frame 302) may have two portions (e.g., portions 404 and 406 of the lead frame housing 402, portions 410 and 412 of the lead frame housing 408), one of which elongates substantially adjacent the mating interface and the other elongates substantially adjacent the mounting interface. The widths (e.g., width w) of the elongated portions of the lead frame housings may be significantly smaller than the length of the intermediate portions of the conductive elements. In some embodiments, the width w may be no more than 50% of the length of the intermediate portions of the conductive elements, no more than 40% of the length of the intermediate portions of the conductive elements, or no more than 20% of the length of the intermediate portions of the conductive elements. This configuration may expose the majority of the intermediate portions of the conductive elements and enable the majority of the intermediate portions of the conductive elements to be shielded by one or more corrugated sheets (e.g., corrugated sheets 522, 524, 526). The lead frame housings may have center portions (e.g., center portion 414) that are wider than the elongated portions. This configuration may enhance the mechanical strength of the lead frame assemblies. The lead frame housings may have tabs (e.g., tabs 416) that extend substantially perpendicular to adjacent portions of the intermediate portions of the conductive elements. Features of the lead frame housing (e.g., center portion 414, tabs 416, elongated portions 418) may be aligned with complementary features of the corrugated sheets such as recesses and openings so as to ensure accurate positioning of the corrugated sheets relative to the conductive elements of the lead frame assembly.

Figure 4C:
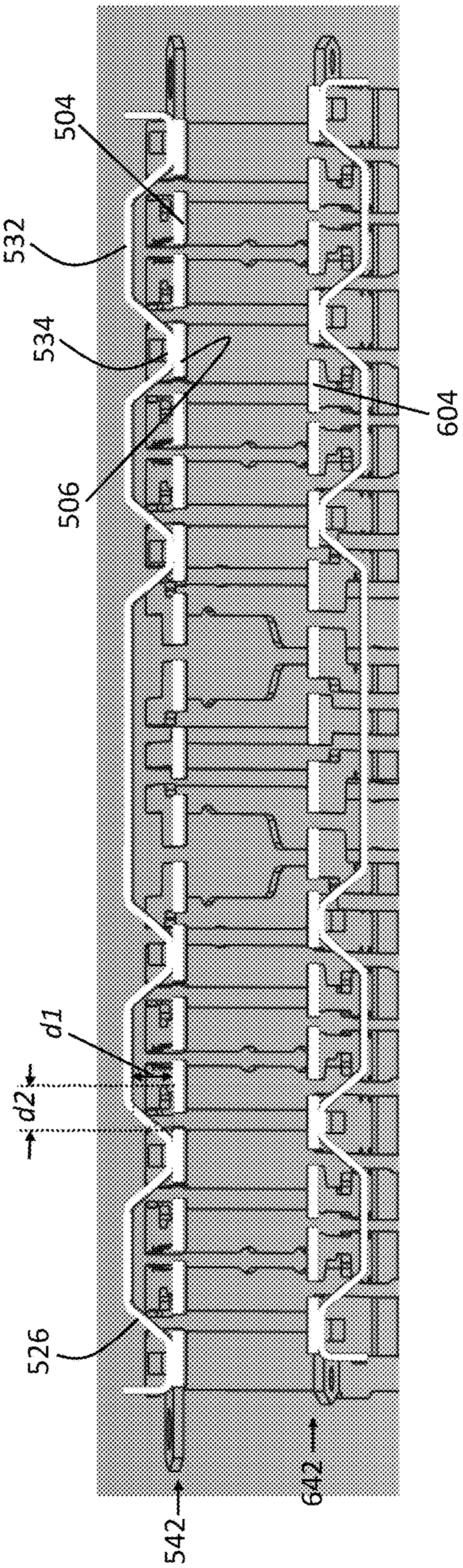
FIG. 4C is a partial cross-sectional view of the lead frame assemblies of FIG. 4A along the line marked "4C-4C" in FIG. 4A, according to some embodiments.
Figure 5A:
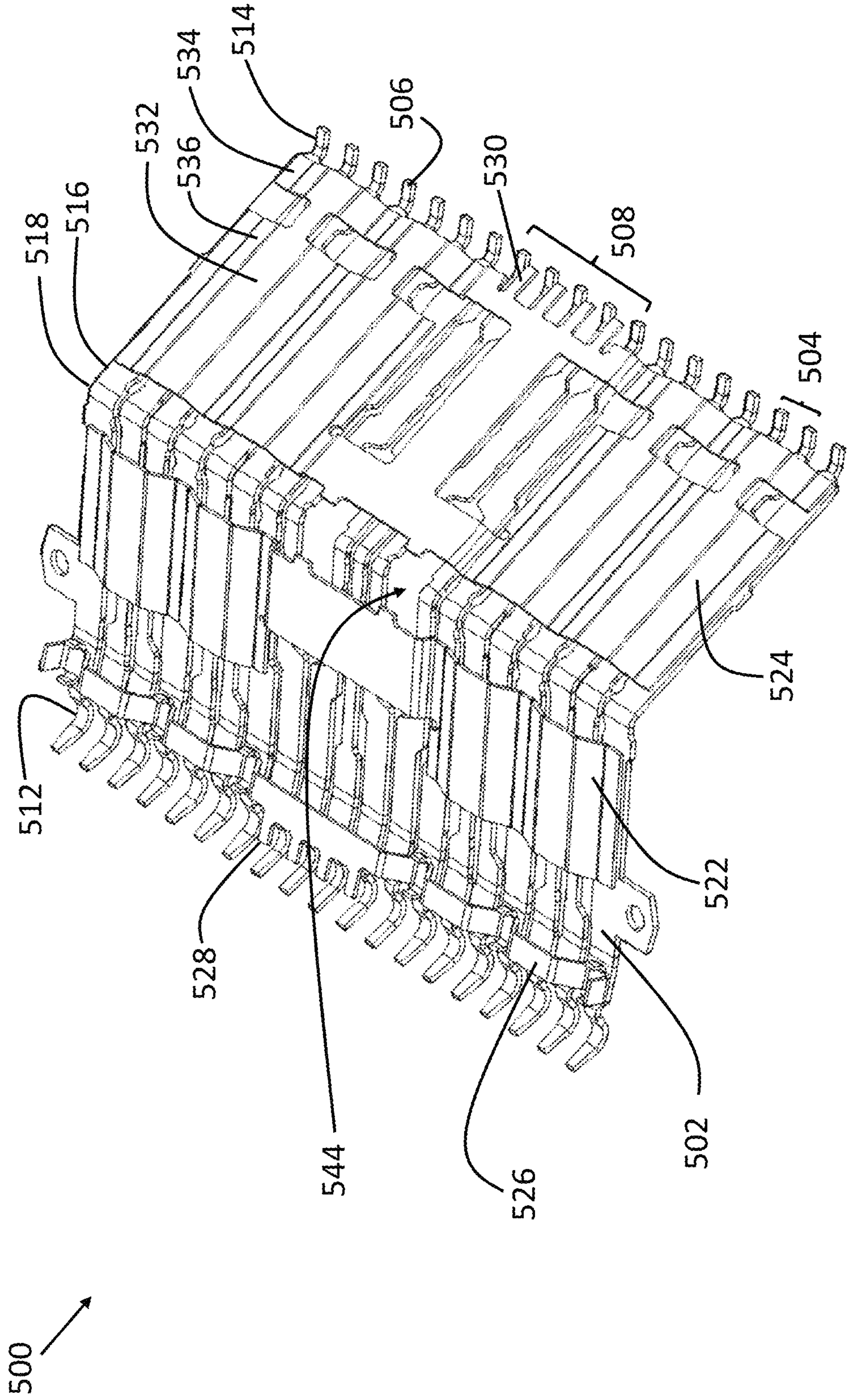
FIG. 5A is a top, side perspective view of the top lead frame assembly of FIG. 3, with the lead frame housing hidden, according to some embodiments.
Figure 5B:
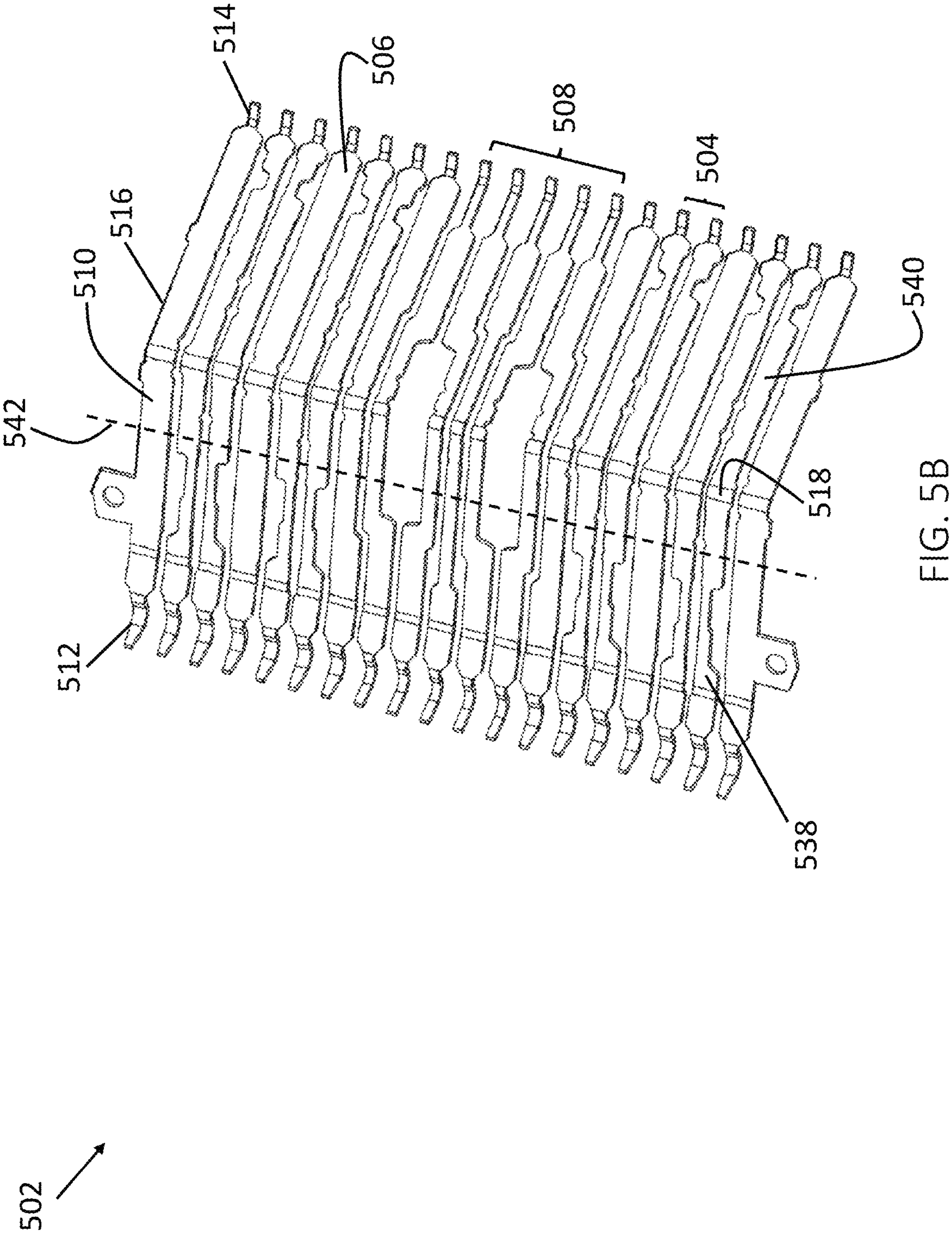
FIG. 5B is a top perspective view of the lead frame of FIG. 5A, according to some embodiments.

The lead frames of the assemblies may include rows (e.g., row 542) of conductive elements 510 held by the lead frame housings. FIG. 4C shows a partial cross-sectional view of the lead frame assemblies of 302 and 304 along the line marked "4C-4C" in FIG. 4A, according to some embodiments. FIG. 5A shows a top perspective view of a part 500 of the top lead frame assembly 304, with the lead frame housing 402 removed, according to some embodiments. FIG. 5B is a top perspective view of a lead frame 502 of the top lead frame assembly 304, according to some embodiments. Each conductive element 510 may include a mating portion 512, a mounting portion 514 opposite the mating portion 512, and an intermediate portion 516 extending between the mating portion 512 and the mounting portion 514. The intermediate portion 516 may include first and second portion 538 and 540, separated by a transition region 518, which may include an inflection point. In the illustrated example, the mounting portions 514 may include tails configured to be surface mounted to a board. Other forms of contact tails may be used including, for example, press fit, "eye of the needle," contacts.

Some of the conductive elements in each row may serve as signal conductors (e.g., signal conductors 504) and others of which may serve as ground conductors (e.g., ground conductors 516). It should be appreciated that ground conductors need not be connected to earth ground, but are shaped to carry reference potentials, which may include earth ground, DC voltages or other suitable reference potentials. The "ground" or "reference" conductors may have a shape different from the signal conductors, which are configured to provide suitable signal transmission properties for high frequency signals. In the embodiment illustrated, signal conductors within a column are grouped in pairs positioned for edge-coupling to support a differential signal. In some embodiments, signal conductors, or pairs of signal conductors, may be interspersed with ground conductors along a row. The conductive elements may make a repeating Ground-Signal-Signal (G-S-S) pattern or G-S-S-G pattern. In some embodiments, the pattern may be interrupted, such as by conductive elements configured for power or low frequency control signals. For example, the conductive elements 508 corresponding to the wider center portions (e.g., center portion 414) of the lead frame housing may be configured for power or low frequency signals.

Figure 5C:
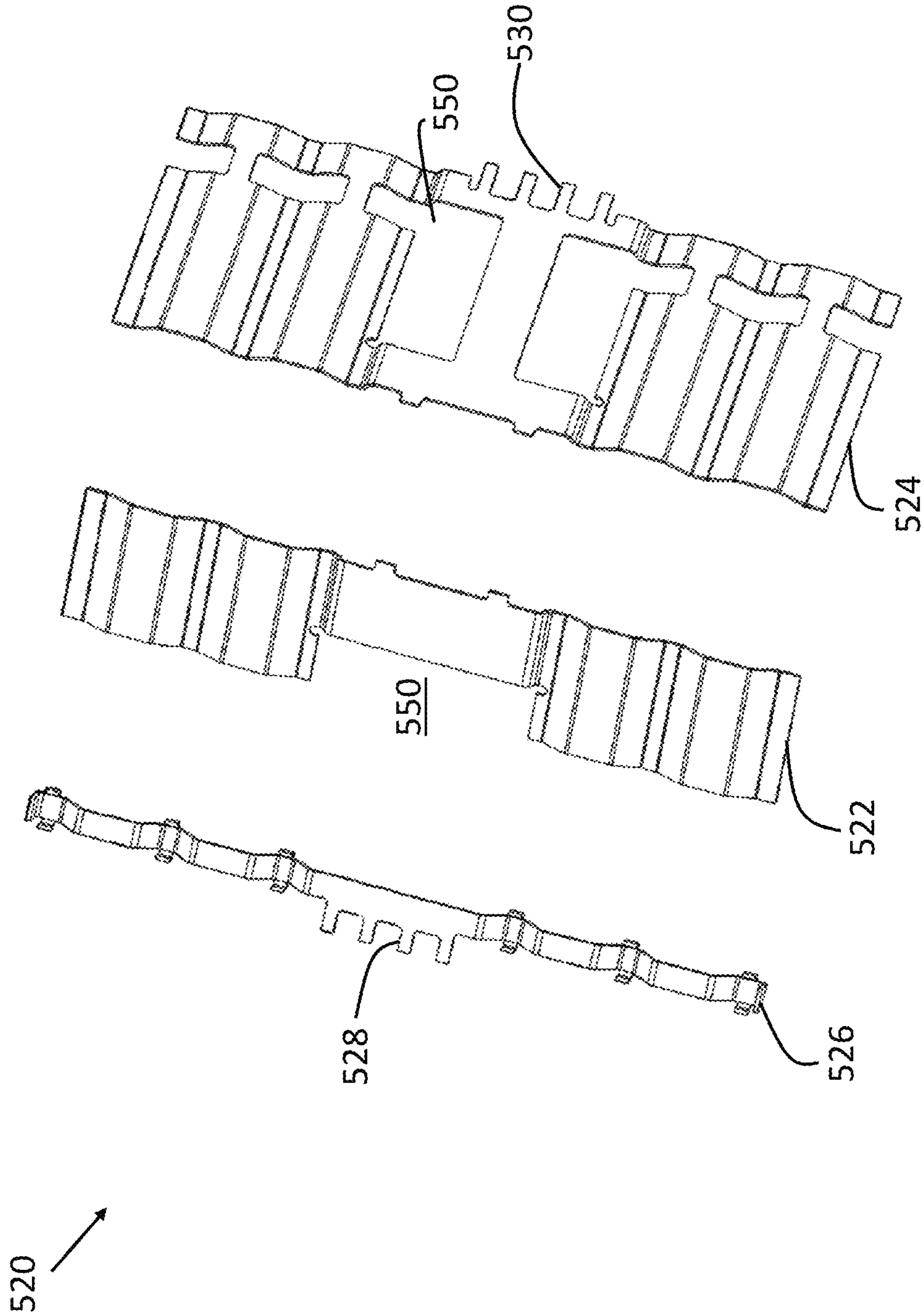
FIG. 5C is a top perspective view of the corrugated sheets of FIG. 5A, with the lead frame and lead frame housing hidden, according to some embodiments.
Figure 5E:
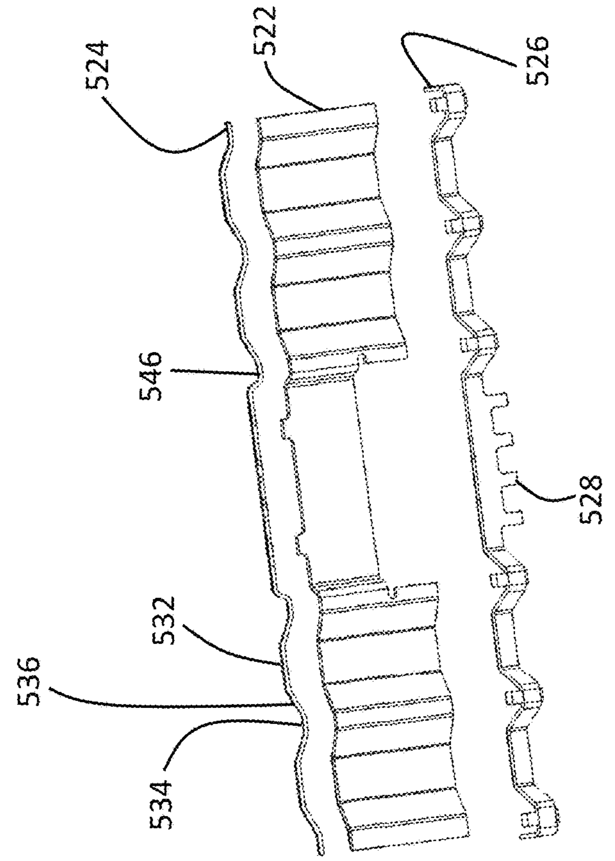
FIG. 5E is a perspective view of the corrugated sheets of FIG. 5C, looking from the mounting interface, according to some embodiments.
Figure 5D:
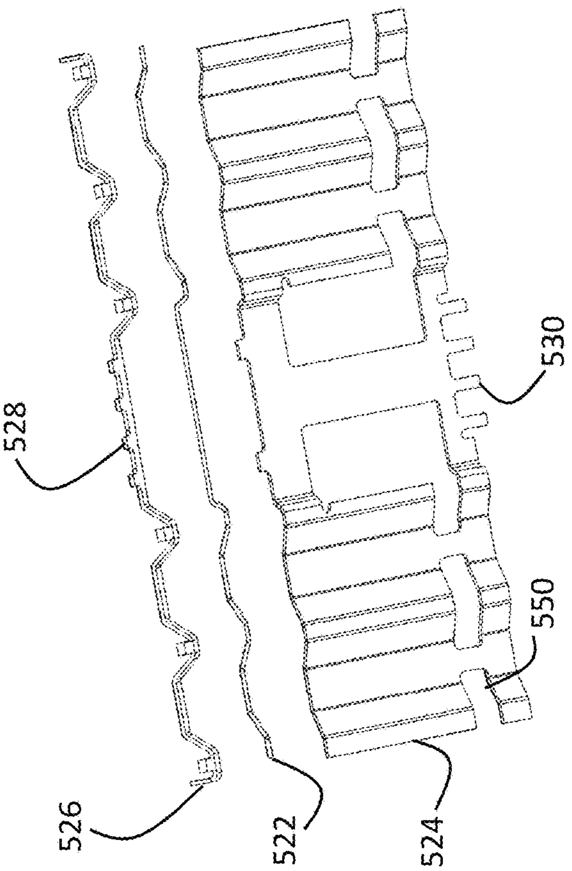
FIG. 5D is a perspective view of the corrugated sheets of FIG. 5C, looking from the mating interface, according to some embodiments.

Corrugated sheet or sheets may be mechanically attached to a lead frame containing the row of conductive elements where the pattern is interrupted. FIG. 5C shows a top perspective view of the corrugated sheets 522, 524, 526, with the lead frame 502 removed, according to some embodiments. FIG. 5D shows a perspective view of the corrugated sheets 522, 524, 526, looking from the mating interface, according to some embodiments. FIG. 5E is a perspective view of the corrugated sheets 522, 524, 526, looking from the mounting interface, according to some embodiments. As illustrated, the corrugated sheets may have plateaus 532 and valleys 534 connected by transition portions 536. The valleys may be attached to the ground conductors 506. Attachment may be made via laser welding. In some embodiments, the attachment may be via a line weld along greater than 50% of the length of the intermediate portions of the conductive elements. In some embodiments, the weld areas may occupy greater than 60%, 70%, 80% or 90% of the intermediate portions of the conductive elements.

The corrugated sheet or sheets may extend substantially along the length of the intermediate portions of the conductive elements. Such a configuration enables shielding of the signal conductors in a fashion similar to the shielding of the wires of coaxial or twinax cables, which enables connectors to operate at high frequency with high performance. In the illustrated example, the top lead frame assembly 304 includes three corrugated sheets 522, 524, 526. A first corrugated sheet 522 is between a first portion 404 of the lead frame housing 402 and the transition regions 518 of the conductive elements. A second corrugated sheet 524 is between the transition regions 518 of the conductive elements and the mounting interface. A third corrugated sheet 526 is adjacent the mating interface.

The inventors have recognized and appreciated a tradeoff between the number of valleys and the uniformity of the corrugated sheets. In the illustrated example, the center portions of the corrugated sheets do not have valleys, which improves manufacturing uniformity. On the other hand, the center portions of the second and third corrugated sheets include projections 528 and 530 extending between adjacent center conductive elements. The projections 528 and 530 may provide shielding at the mating interface and the mounting interface where crosstalk may be more serious. In some embodiments, the projections 528 and 530 may also be the tie bars connecting the corrugated sheet 526 to a strip before severing the tie bars from the strip.

The corrugated sheets 522, 524, 526 may be made of material that is electrically conductive or lossy such that the ground conductors are electrically coupled through the corrugated sheets 522, 524, 526. In some embodiments, the corrugated sheets may be made of stainless steel, which may be easier for laser welding than copper, but less conductive than copper such that it functions more like lossy material.

The inventors have recognized and appreciated methods to manufacture the corrugated sheets uniformly through the connector. In some embodiments, the method may begin with providing a lead frame comprising a plurality of conductive elements (e.g., conductive elements 510) disposed in a row (e.g., row 542). The method may include molding an insulative material over first selected regions of intermediate portions of the conductive elements, such as molding the lead frame housings 402 and 408 over respective lead frames. The method may include providing the corrugated sheets. In some embodiments, the corrugated sheets may be stamped of a sheet material. The sheet material may be flat before stamping. The sheet material may be, but need not be, stretchable. If there are multiple corrugated sheets, the sheets may be stamped at the same time and held on a strip.

The sheets may have openings and/or recesses that fit with alignment features, such as tabs, of the lead frame housings. The method may include aligning the sheets with second selected regions of the intermediate portions of the conductive elements by aligning the openings 550 and/or recesses of the sheets with the alignment features (e.g. tabs 416 or projections 450) of the lead frame housing, so as to make the manufacturing process more repeatable. In some embodiments, the center portions of the sheets may be first welded to corresponding center ground conductors at first valleys 546. Subsequently, plateaus 532 of side portions of the sheets may be secured in position when valleys 534 of side portions of the sheets are welded to corresponding ground conductors. The sheets may be severed from the strip after welding.

Figure 6:
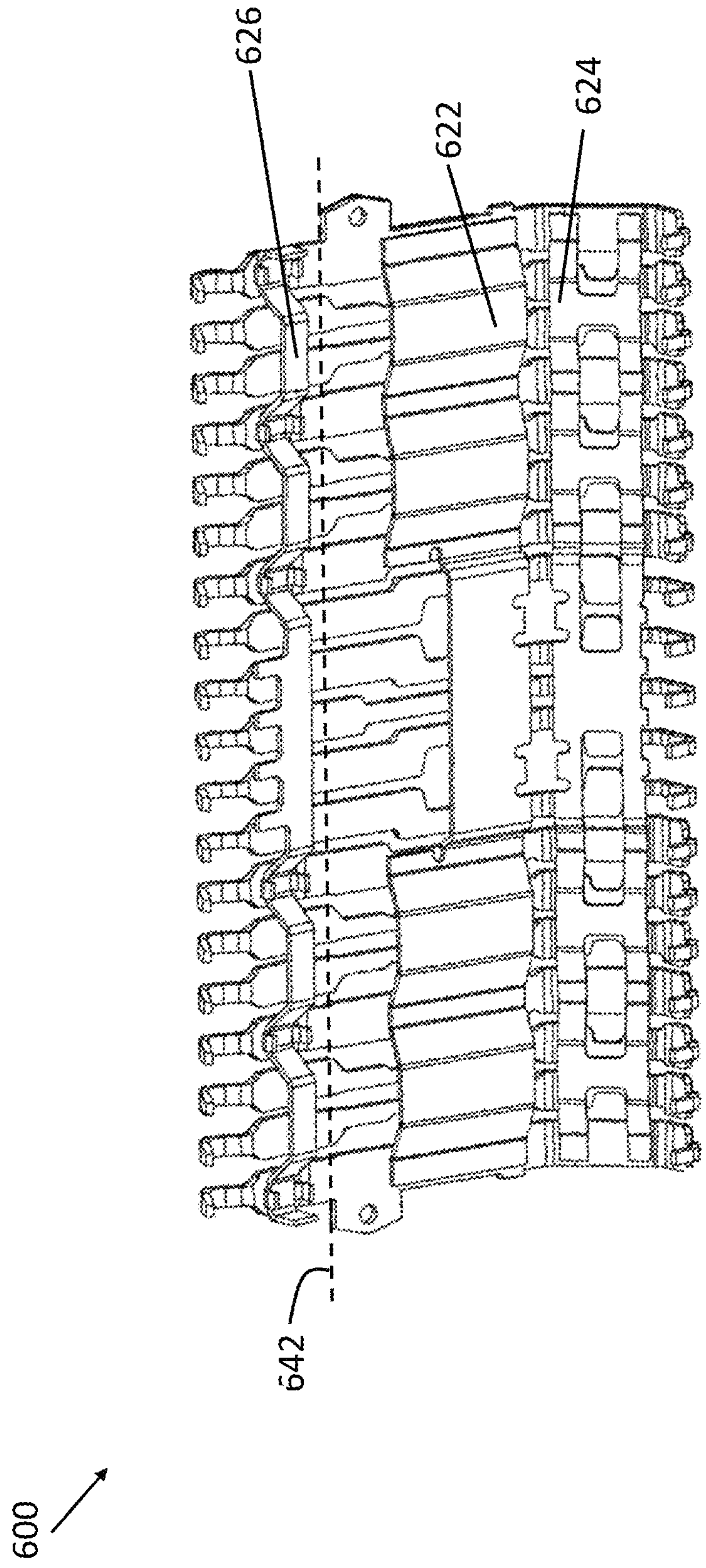
FIG. 6 is a bottom perspective view of the bottom lead frame assembly of FIG. 3, with the lead frame housing hidden, according to some embodiments.

FIG. 6 is a bottom perspective view of a part 600 of the bottom lead frame assembly 302, with the lead frame housing 408 removed, according to some embodiments. The bottom lead frame assembly 302 may include a plurality of conductive elements disposed in a row 642. The bottom lead frame assembly 302 may be configured similar to the top lead frame assembly 304. On the other hand, in the illustrated example, while the corrugated sheets 522, 524, 526 of the top lead frame assembly 304 are on the top surface of the top assembly, the corrugated sheets 622, 624, 626 of the bottom lead frame assembly 302 are on the bottom surface of the bottom assembly. Such configuration enables connector miniaturization. In some embodiments, a lead frame assembly may have corrugated sheets on both top bottom surfaces.

The row 642 of conductive elements of the bottom lead frame assembly may be offset from the row 542 of conductive elements of the top lead frame assembly 304 in a direction that the rows 542 and 642 extend such that the ground conductive elements 506 in the row 642 at least partially overlap with respective signal conductive elements 604 in the row 542 and vice versa. An example is illustrated in FIG. 4C, which shows a partial cross-sectional view of the lead frame assemblies of 302 and 304 along the line marked "4C-4C" in FIG. 4A.

The corrugated sheets may be shaped such that the plateaus may serve as the nearest ground reference for respective signal conductors. In the example illustrated in FIG. 4A, the plateaus of the corrugated sheet 526 are spaced from respective signal conductive elements by a first distance d1 along a direction perpendicular to the row 542. Centers of the signal conductive elements are spaced from edges of respective adjacent ground conductive elements by a second distance d2. The first distance d1 may be configured to be not larger than the second distance d2. In some embodiments, the first distance d1 may equal to the second distance d2, which enables the shielding of the signal conductors in a fashion similar to the shielding of the wires of coaxial or twinax cables, which enables the connector to operate at high frequency with high performance. It should be appreciated that although the plateaus 532 are illustrated as aligned with a pair of signal conductors 504, a plateau of a corrugated shield may be configured to be aligned with a single signal conductor.

Figure 7B:
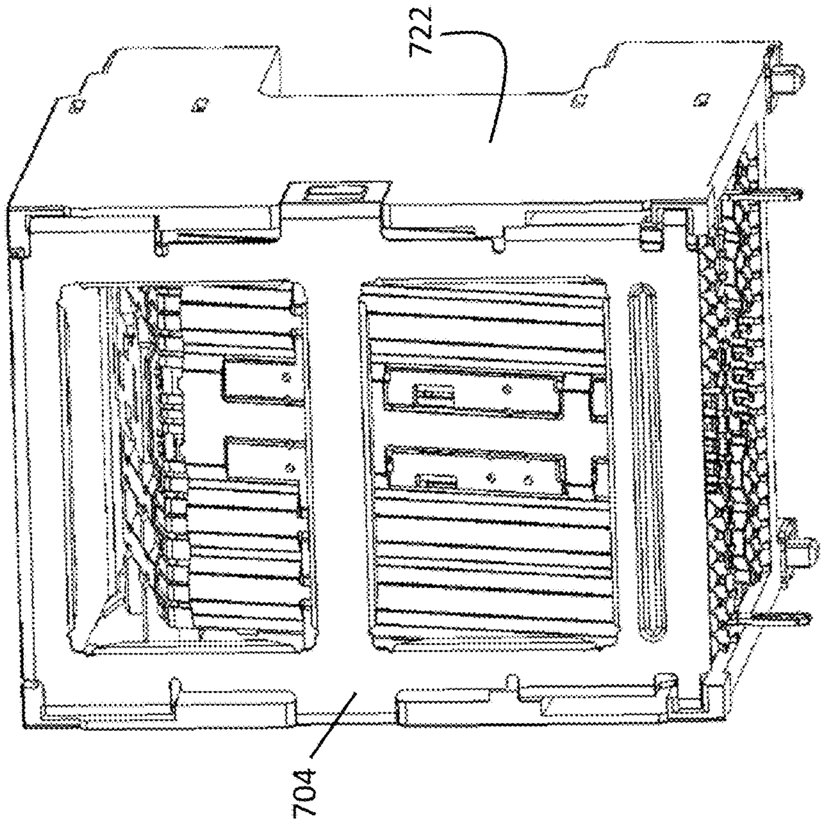
FIG. 7B is a rear, side perspective view of the stacked I/O connector of FIG. 7A, according to some embodiments.
Figure 7A:
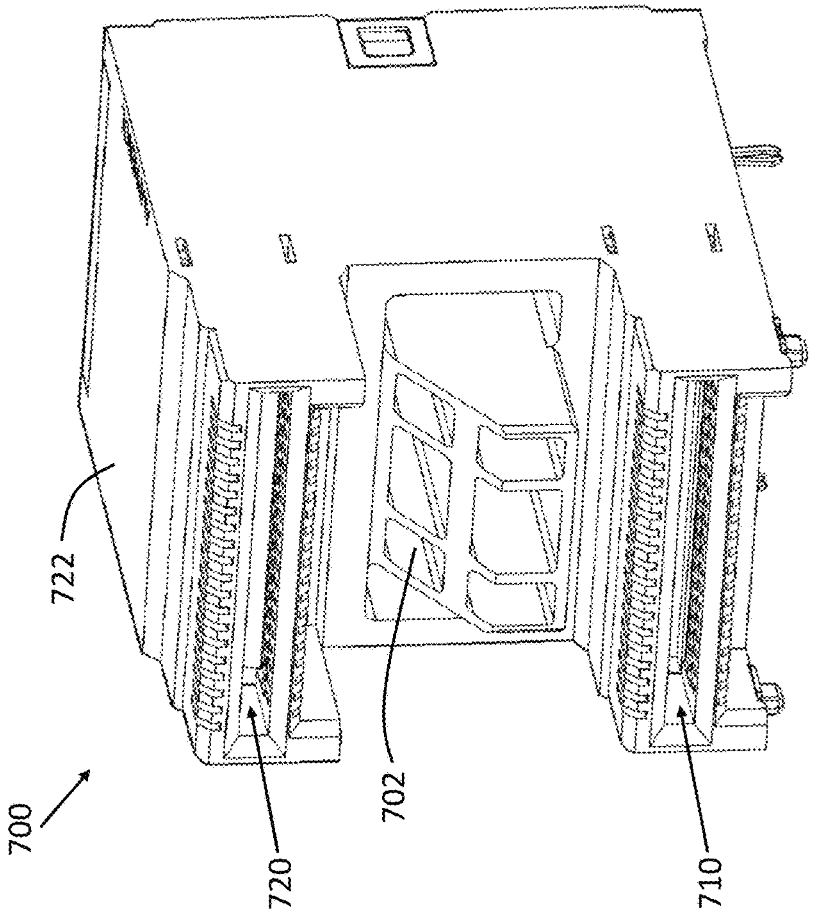
FIG. 7A is a front, side perspective view of a stacked I/O connector, according to some embodiments.
Figure 8:
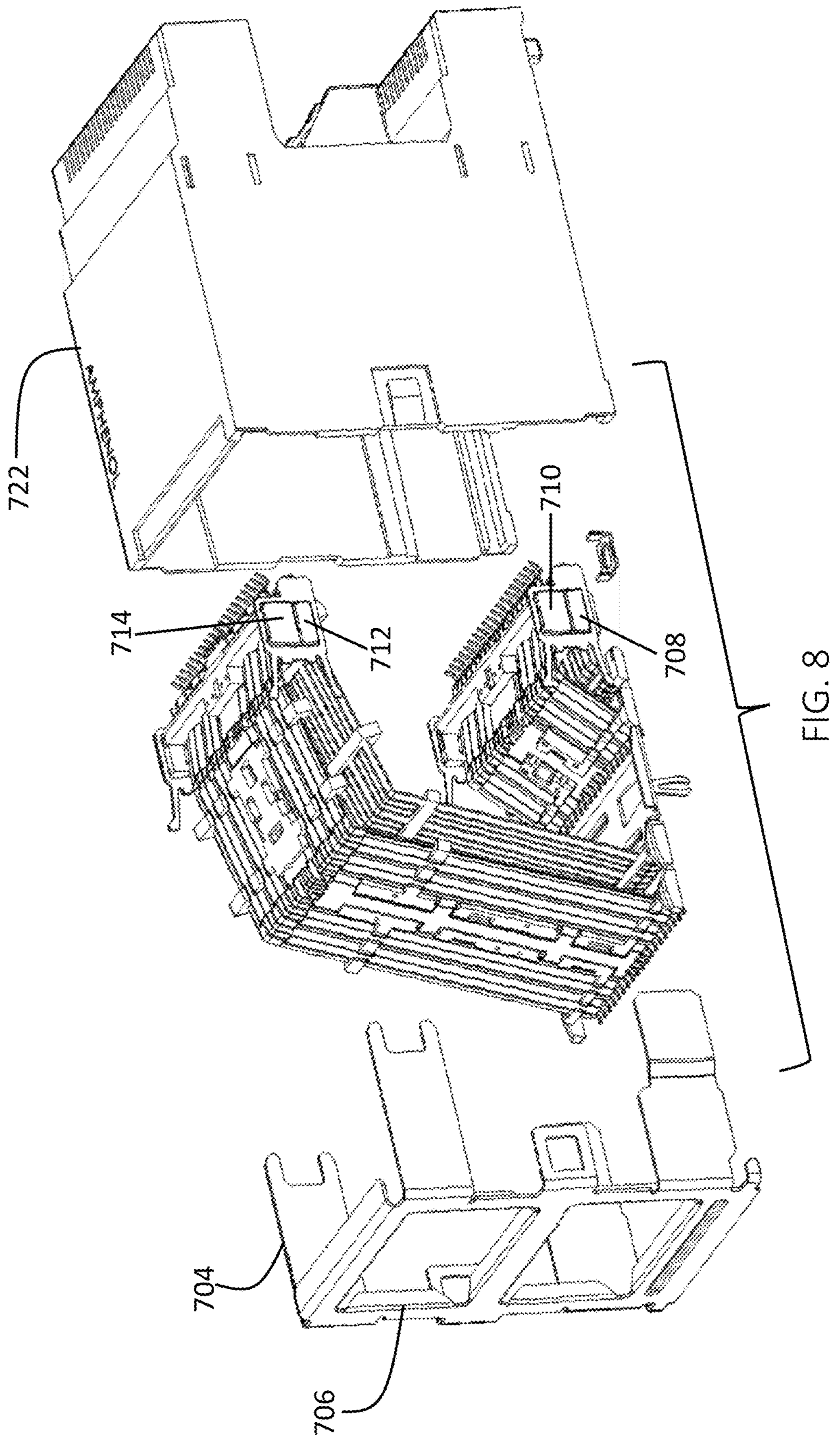
FIG. 8 is a partially exploded view of the stacked I/O connector of FIG. 7A, according to some embodiments.

Some I/O receptacle connectors may have multiple ports that each may mate with a plug connector. When the ports are stacked above the other, the I/O connector may be referred to as a "stacked" connector. FIG. 7A shows a front, side perspective view of a stacked I/O connector 700, according to some embodiments. FIG. 7B shows a rear, side perspective view of the stacked I/O connector 700, according to some embodiments. FIG. 8 shows a partially exploded view of the stacked I/O connector 700, according to some embodiments. In this example, the connector 700 is a stacked, surface mount connector, configured for mating with two transceivers inserted into two slots 710 and 720 one above the other. As illustrated, the connector 700 may have a housing 722. The housing 722 may have heat dissipation holes 702 between the two slots 710 and 720. The rear of the housing may have a shell 704 attached. The shell 704 may be made of metal so as to enhance rigidity of the housing 722. The shell 704 may include openings 706 such that heat can be dissipated therethrough. The connector may include four lead frame assemblies 708, 710, 712, and 714 stacked vertically. First and second assemblies 708 and 710 are configured to receive a transceiver from the lower slot 710. Third and fourth assemblies 712 and 714 are configured to receive a transceiver from the higher slot 720. Materials and techniques as described above may be used to manufacture lead frame assemblies 708, 710, 712, and 714.

Figure 9B:
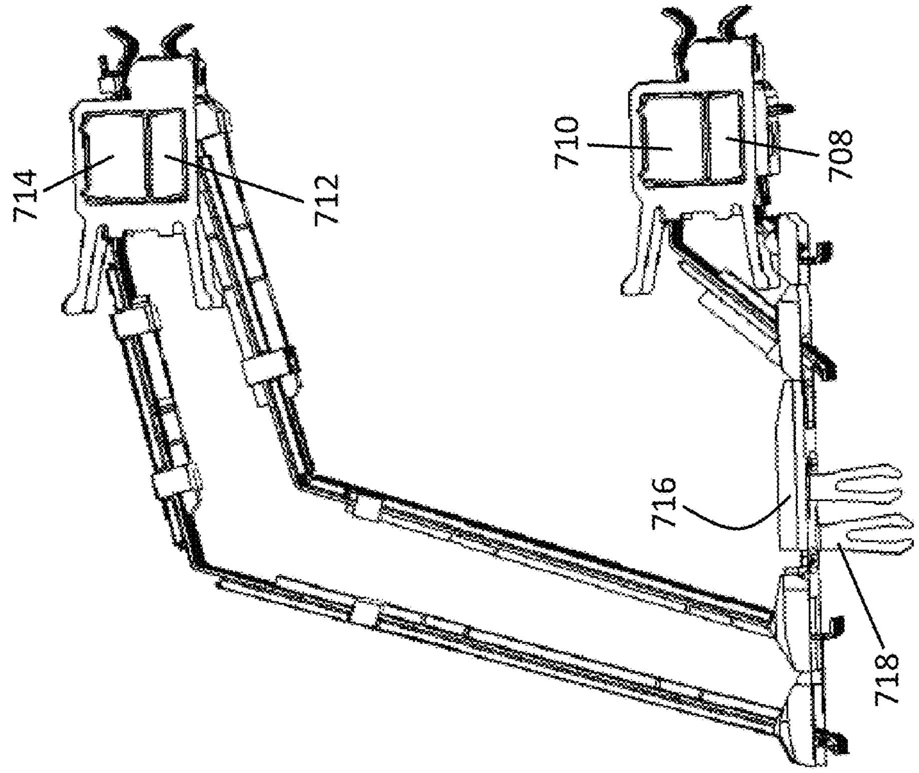
FIG. 9B is a side perspective view of the lead frame assemblies of FIG. 9A, according to some embodiments.
Figure 9A:
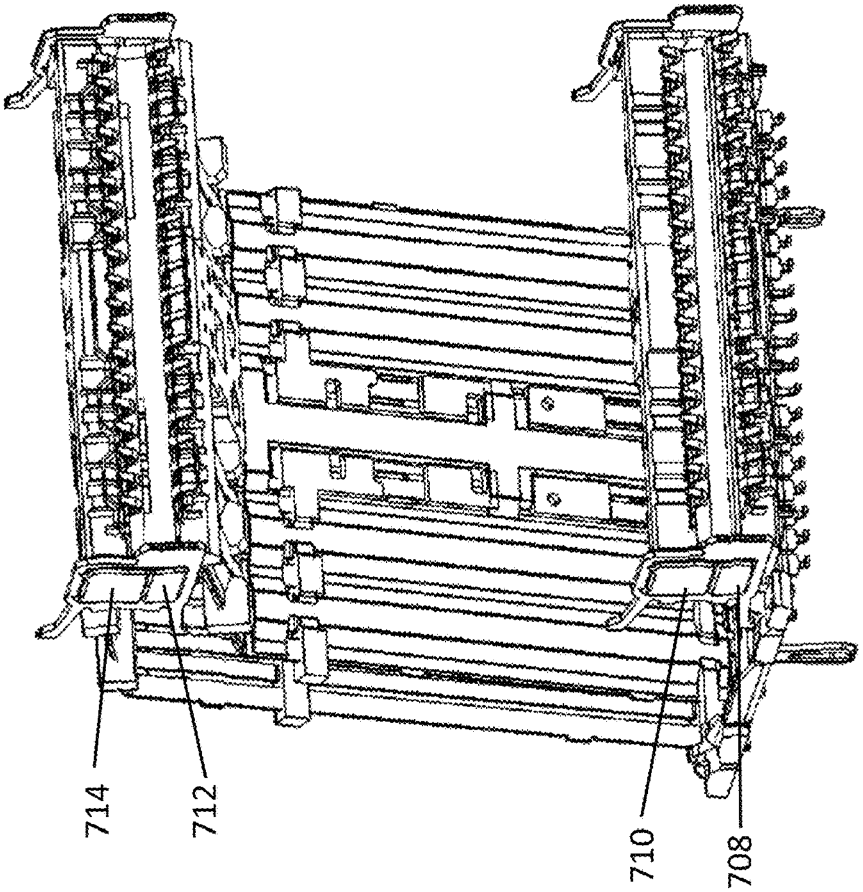
FIG. 9A is a front, side perspective view of the lead frame assemblies of the stacked I/O connector of FIG. 8, according to some embodiments.

FIG. 9A shows a front, side perspective view of the lead frame assemblies 708, 710, 712, and 714 of the stacked I/O connector 700, according to some embodiments. FIG. 9B shows a side view of the lead frame assemblies 708, 710, 712, and 714, according to some embodiments. As illustrated, the first and second assemblies 708 and 710 may be configured similar to the assemblies 302 and 304 of FIGS. 4A-4B. The third and fourth assemblies 712 and 714 may also be configured similarly but with features adapted for stacking them on top of the first and second assemblies 708 and 710. The connector may include a member 716 extending between the lead frame housings of the second and third assemblies 710 and 712 such that when the lead frame assembly 712 is stacked above the lead frame assembly 710. The projections of the second and third lead frame housings may push against the member 716, which ensures positional relationship between the assemblies in the mating direction. The member 716 may include fastening features such as forks 718 configured to mount to a board.

Figure 10A:
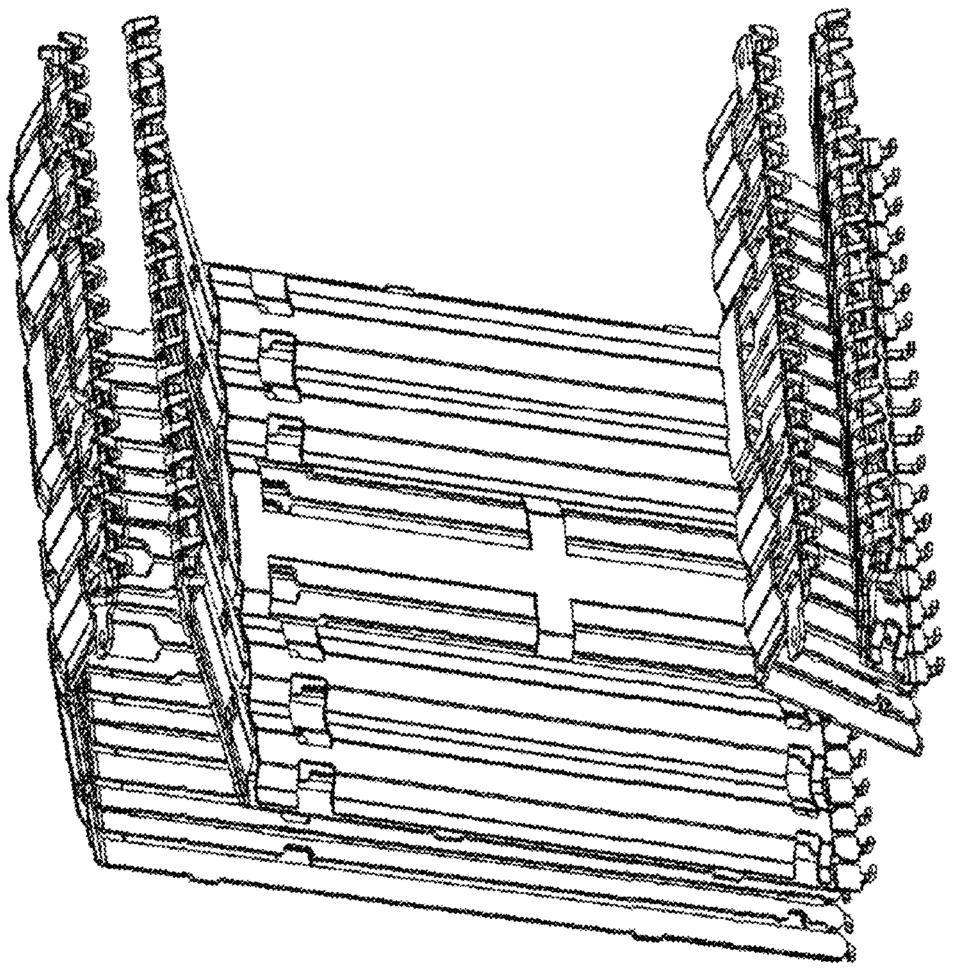
FIG. 10A is a front, side perspective view of the lead frame assemblies of FIG. 9A, with the lead frame housings removed, according to some embodiments.
Figure 10B:
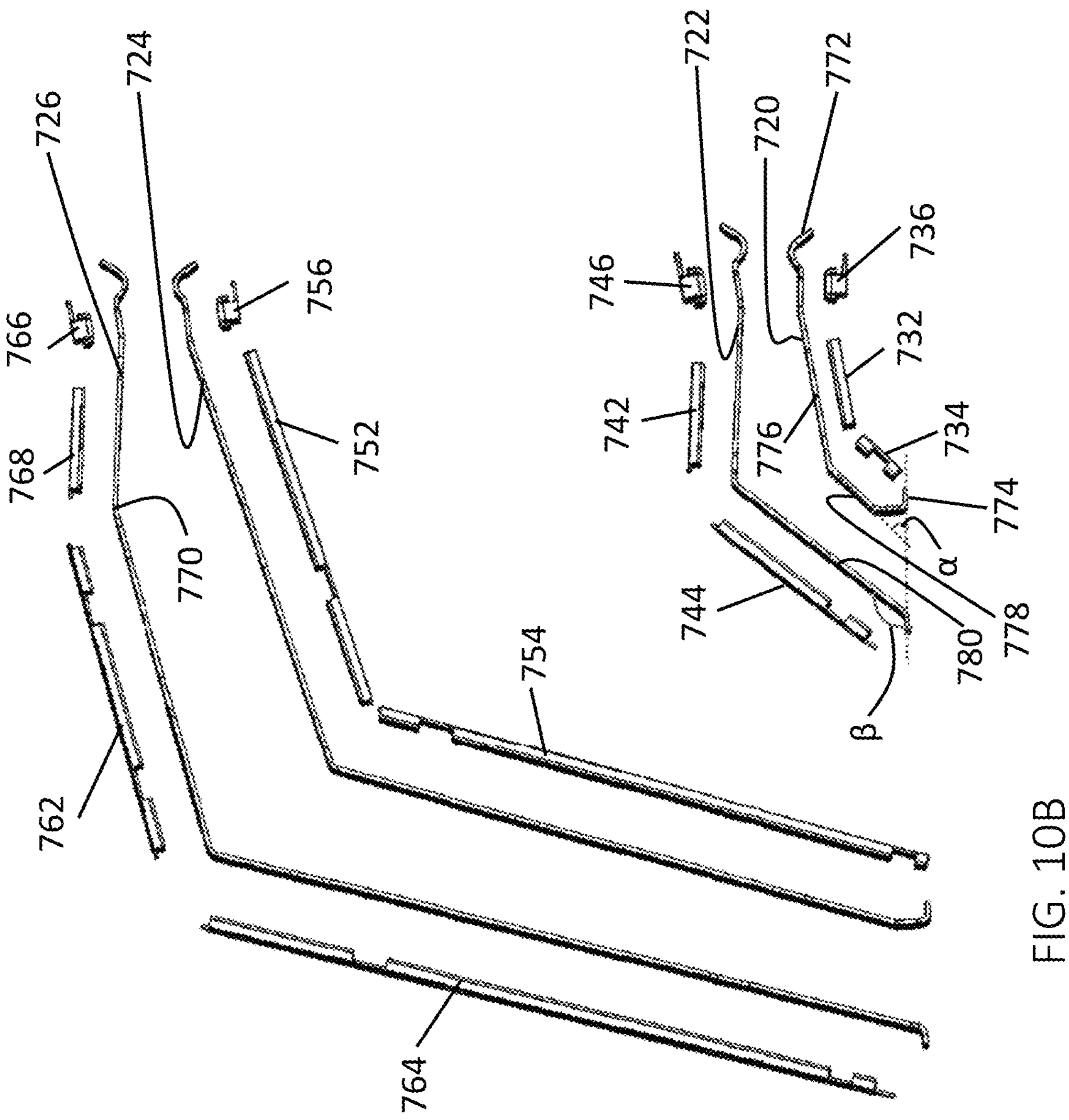
FIG. 10B is a side perspective view of the lead frame assemblies of FIG. 10A, according to some embodiments.
Figure 11A:
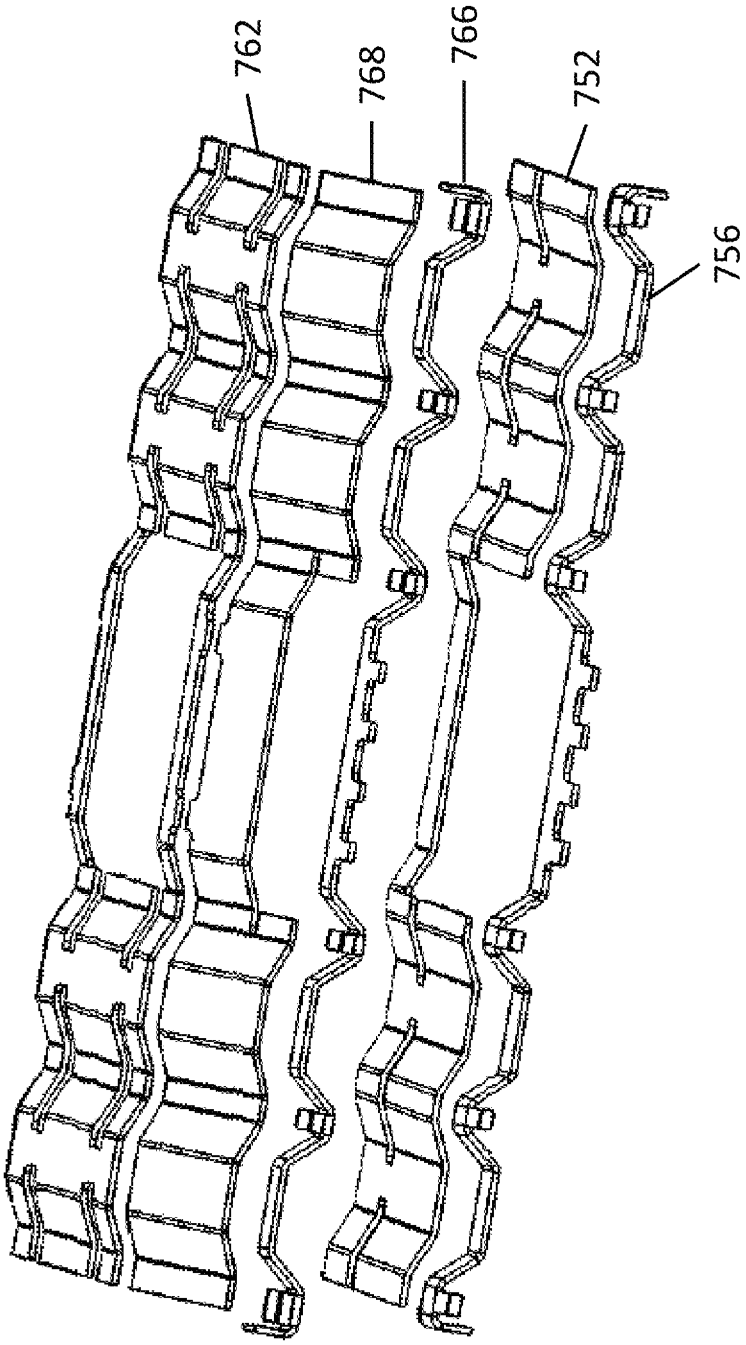
FIG. 11A is a perspective view of the corrugated sheets of the top lead frame assembly of FIG. 10A, looking from the mating interface, with sheets at the mounting side removed, according to some embodiments.
Figure 11B:
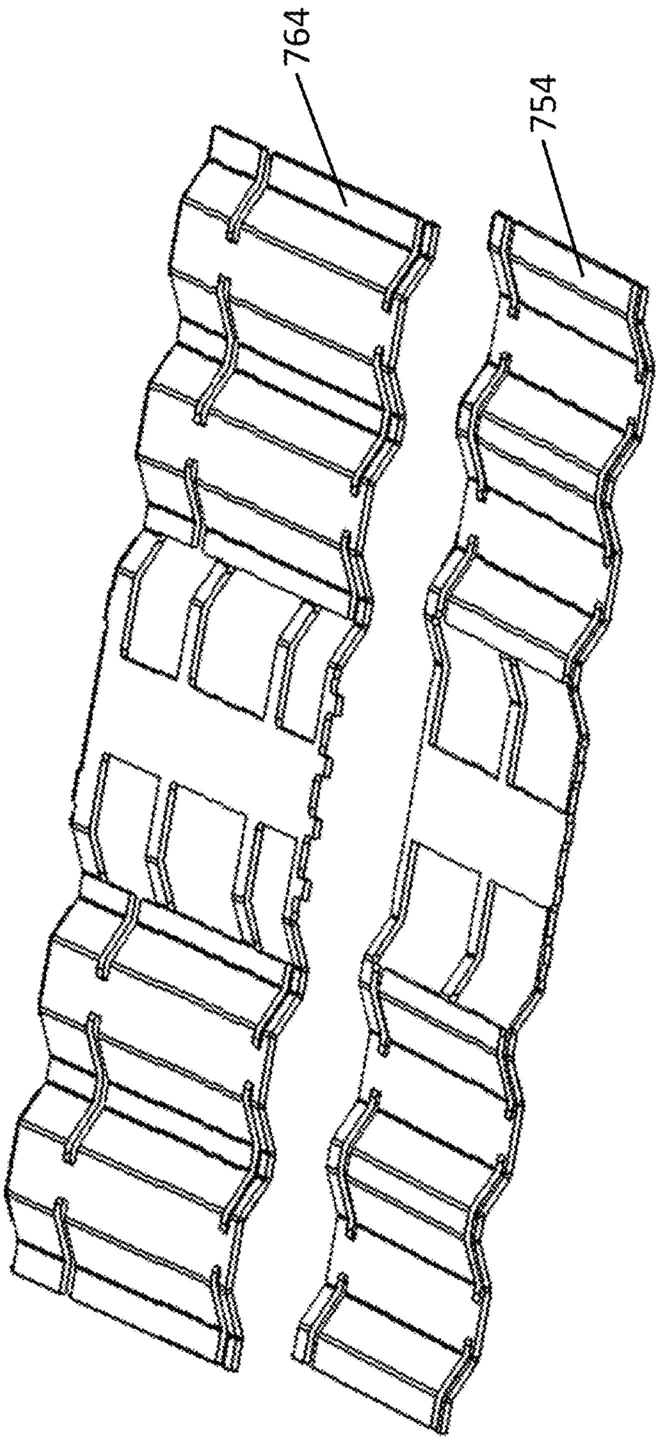
FIG. 11B is a perspective view of the corrugated sheets of the top lead frame assembly of FIG. 10A, looking from the mounting interface, with sheets at the mating side removed, according to some embodiments.

FIG. 10A shows a front, side perspective view of a part 1000 of the lead frame assemblies 708, 710, 712, and 714, with the lead frame housings removed, according to some embodiments. FIG. 10B is a side perspective view of the part 1000 of the lead frame assemblies 708, 710, 712, and 714, according to some embodiments. FIG. 11A is a perspective view of the corrugated sheets of the third and fourth lead frame assemblies 712 and 714, looking from the mating interface, with sheets at the mounting side removed, according to some embodiments. FIG. 11B is a perspective view of the corrugated sheets of the third and fourth lead frame assemblies 712 and 714, looking from the mounting interface, with sheets at the mating side removed, according to some embodiments.

In the illustrated example, the lead frame assemblies 708, 710, 712, and 714 include lead frames 720, 722, 724, and 726 respectively. Like the lead frame 502 of FIG. 5B, the lead frames 720, 722, 724, and 726 each may include a plurality of conductive elements disposed in a row. Each conductive element may include a mating contact portion 772, a mounting portion 774 opposite the mating contact portion 772, and an intermediate portion 776 extending between the mating contact portion 772 and the mounting portion 774.

The intermediate portions 776 each may include two or more portions, separated by one or more transition regions 770. Each portion of the intermediate portions may have a corresponding corrugated sheet. In the illustrated example, the lead frame 720 has three corrugated sheets 732, 734, and 726; the lead frame 722 has three corrugated sheets 742, 744, and 746; the lead frame 724 has three corrugated sheets 752, 754, and 756; the lead frame 726 has four corrugated sheets 762, 764, 766, and 768. For each lead frame assembly, the corresponding corrugated sheets may together cover substantially all of the length of the intermediate portions of the conductive elements. In some embodiments, the corresponding corrugated sheets may together cover at least 60% of the length of the intermediate portions of the conductive elements. In some embodiments, the coverage may be more than 70% or more than 80%, for example.

The mounting portions 774 may include tails configured to be surface mounted to a board. The tails of the lead frame assemblies 720 and 722 may extend in first and second directions opposite each other. The first and second directions may be parallel to a surface of the board. In the illustrated example, portions 778 of the intermediate portions of the conductive elements of the lead frame 720 may extend at a first angle α to the first direction. Portions 780 of the intermediate portions of the conductive elements of the lead frame 722 may extend at a second angle β to the second direction. The first and second angles α and β may be supplementary angles such that the portions of the intermediate portions of the conductive elements of the lead frame 720 are parallel to the portions of the intermediate portions of the conductive elements of the lead frame 722. Additionally or alternatively, the second angle β may be an obtuse angle such that the portions of the intermediate portions of the conductive elements of the lead frame 720 may have an area larger than that if second angle β is a right angle. Having a larger area facing the rear of the connector housing may promote heat dissipation.

Figure 12B:
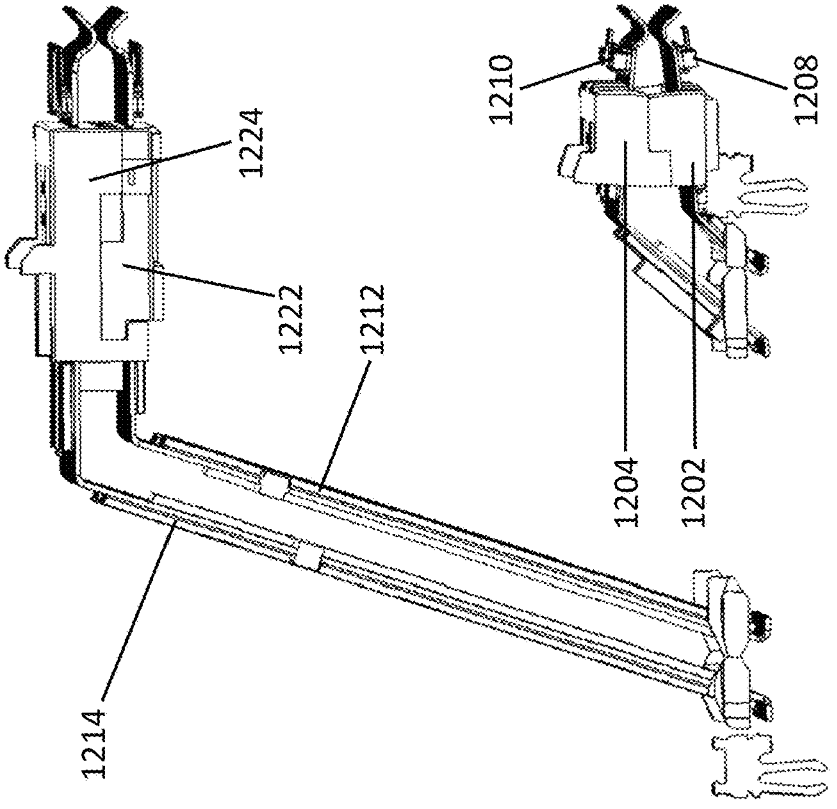
FIG. 12B is a side perspective view of the lead frame assemblies of FIG. 12A, according to some embodiments.
Figure 12A:
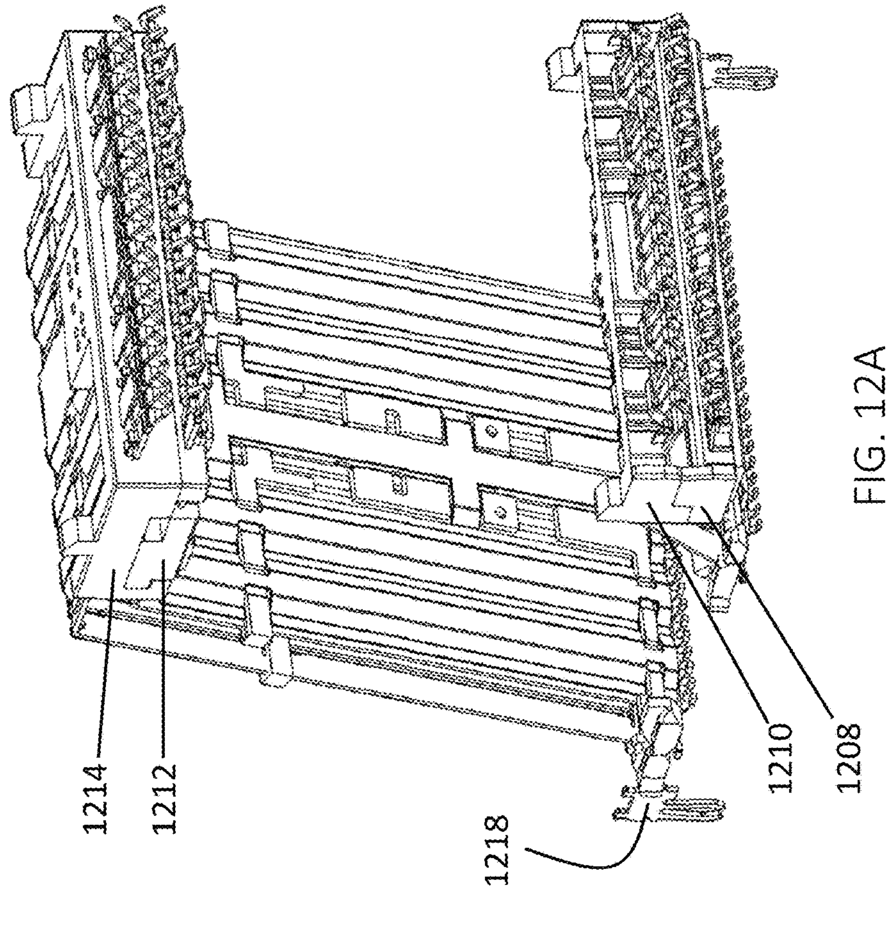
FIG. 12A is a perspective view of an alternative embodiment of the lead frame assemblies of FIG. 9A, according to some embodiments.
Figure 12C:
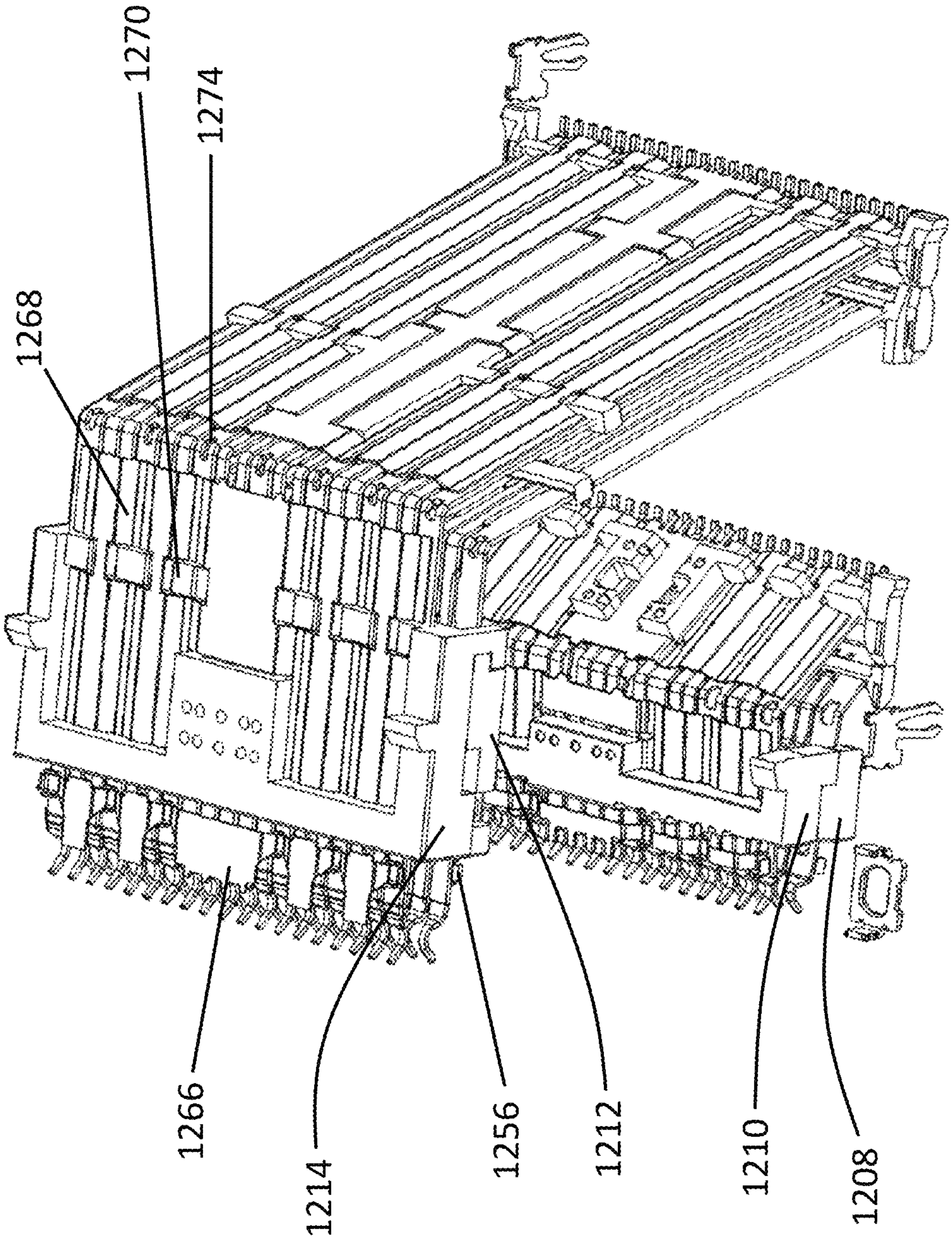
FIG. 12C is another perspective view of the lead frame assemblies of FIG. 12A, according to some embodiments.

FIG. 12A shows a perspective view of an alternative embodiment of the lead frame assemblies 708, 710, 712, and 714 shown in FIG. 9A, according to some embodiments. As illustrated, the connector may include lead frame assemblies 1208, 1210, 1212, and 1214 stacked vertically, and a pair of forks 1218, which may be disposed near diagonal corners of the mounting face of the housing 722. FIG. 12B is a side perspective view of the lead frame assemblies 1208, 1210, 1212, and 1214. FIG. 12C is another perspective view of the lead frame assemblies 1208, 1210, 1212, and 1214, according to some embodiments.

Figure 13A:
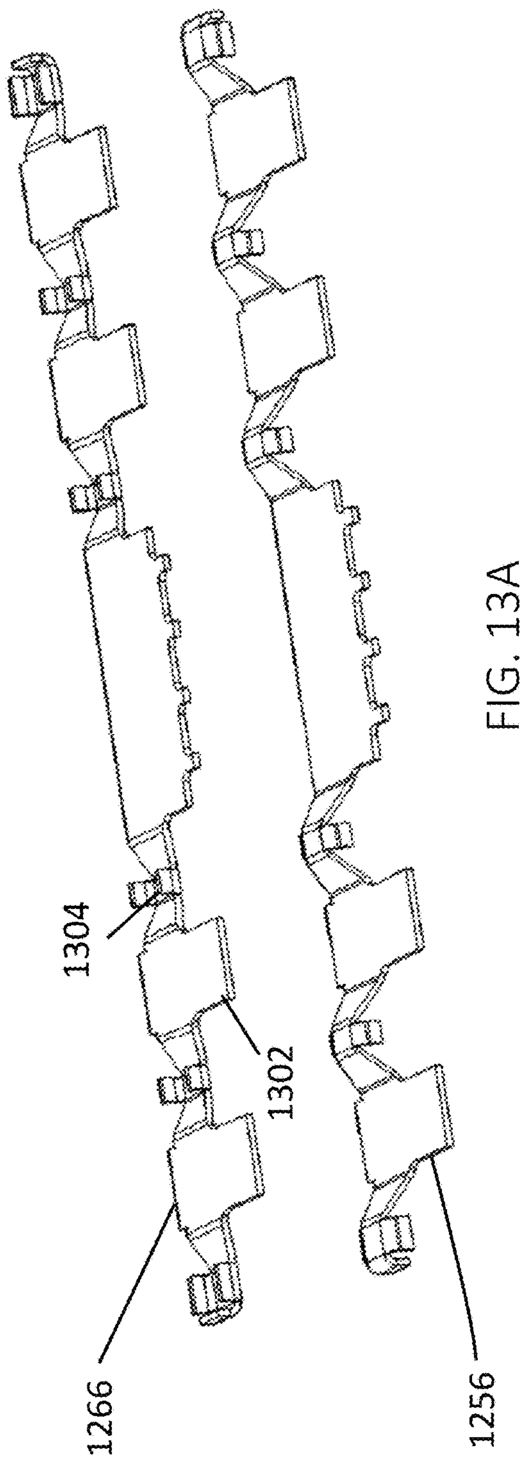
FIG. 13A is a perspective view of a portion of the corrugated sheets of the lead frame assemblies of FIG. 12C, according to some embodiments.
Figure 13B:
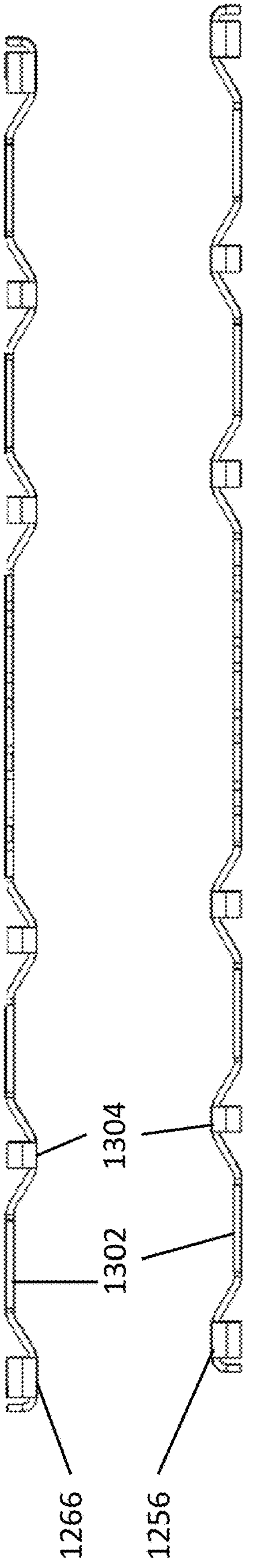
FIG. 13B is a front perspective view of the corrugated sheets of FIG. 13A, according to some embodiments.

The lead frame assemblies 1208, 1210, 1212, and 1214 may include corrugated sheets corresponding to the corrugated sheets shown in FIG. 10B. It should be appreciated that not all corrugated shields are labeled with a reference number in FIG. 12C, which should not limit aspects of the present disclosure. In the illustrated example, the lead frame assembly 1212 includes a corrugated shield 1256, which may correspond to the corrugated shield 756 in FIG. 10B. The lead frame assembly 1214 includes a corrugated shield 1266, which may correspond to the corrugated shield 766 in FIG. 10B, and a corrugated shield 1268, which may correspond to the corrugated shields 762 and 768 in FIG. 10B. FIG. 13A shows a perspective view of the corrugated sheet 1256 of the lead frame assembly 1212 and the corrugated sheet 1266 of the lead frame assembly 1214. FIG. 13B shows a front perspective view of the corrugated sheets 1256 and 1266. The plateaus 1302 of the corrugated sheets 1256 and 1266 may extend beyond the valleys 1304 and away from respective lead frame housings 1222 and 1224 and toward mating contact portions of the conductive elements. Such a configuration may reduce signal distortions at the mating interface and therefore improve the integrity of the signals passing through, even at high frequencies.

As illustrated in FIG. 12C, the lead frame assembly 1214 may include a housing member 1270 having features that facilitate accurate alignment of the corrugated shield 1268 to the plurality of conductive elements of the lead frame of the lead frame assembly 1214. As illustrated, the features of the housing member 1270 may be projections at the central portion (in a row direction) of the lead frame assembly 1214. Additionally, some of the projections may be substantially aligned with ground conductive elements of the lead frame assembly 1214. The ground conductive elements may be wider than signal conductive elements and may include holes 1274 in their transition regions. The holes may facilitate bending the lead frame to form the transition regions. The holes, for example, may enable the transition regions to more accurately retain a desired angle.

Figure 14:
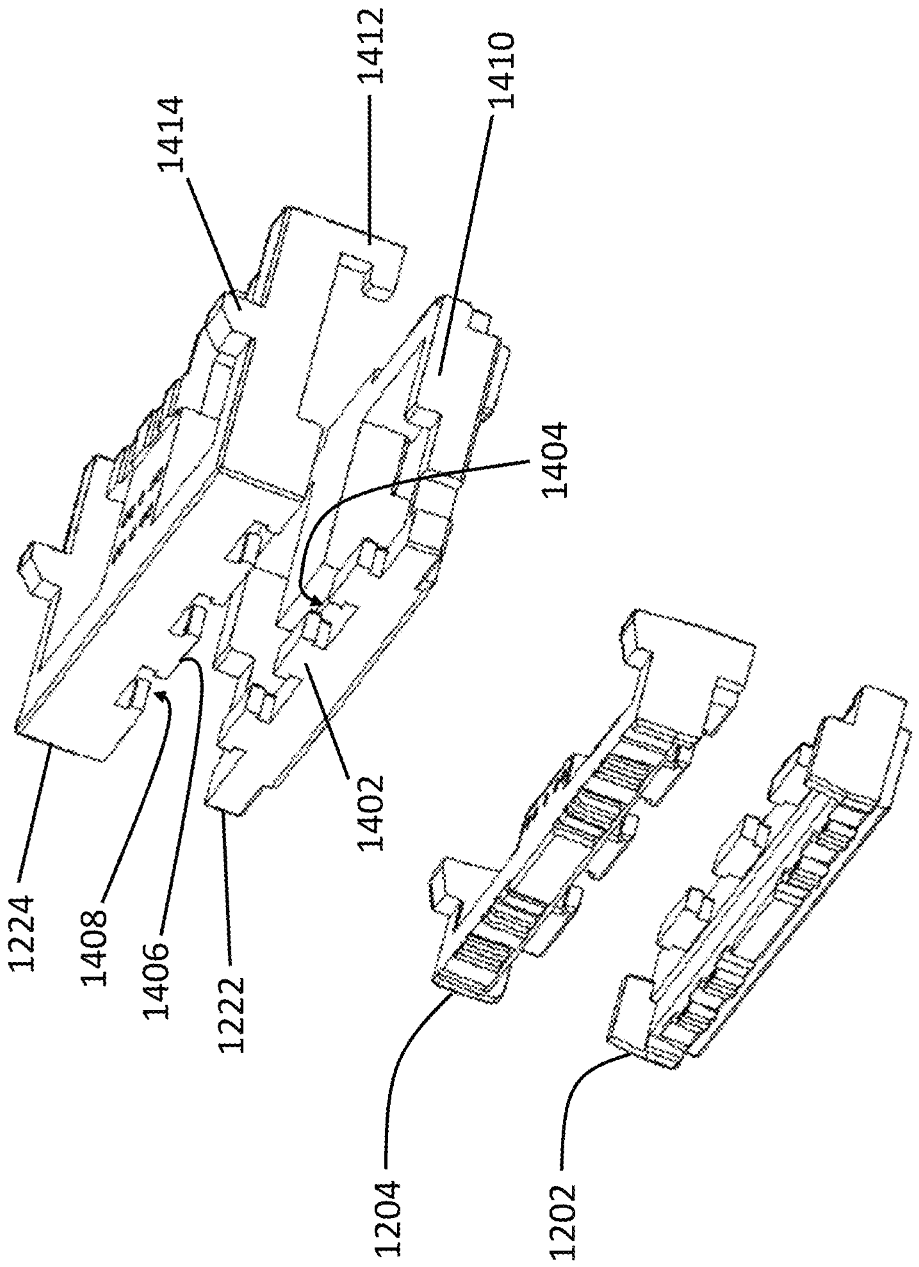
FIG. 14 is a perspective view of lead frame housings of the lead frame assemblies of FIG. 12C, according to some embodiments.

Referring back to FIG. 12B, the lead frame assemblies 1208, 1210, 1212, and 1214 may include lead frame housings 1202, 1204, 1222, and 1224, respectively. The lead frame housings may be shaped to establish accurate relative positioning between rows of conductive elements. FIG. 14 shows a perspective view of the lead frame housings 1202, 1204, 1222, and 1224 of the lead frame assemblies 1208, 1210, 1212, and 1214.

As illustrated, the lead frame housing 1222 may include features 1402 aligned parallel to the row direction and separated from each other by gaps 1404. The lead frame housing 1224 may include features 1406 aligned parallel to the row direction and separated from each other by gaps 1408. The features 1406 of the lead frame housing 1224 may be shaped to fit in the gaps 1404 of the lead frame housing 1222. The features 1402 of the lead frame housing 1222 may be shaped to fit in the gaps 1408 of the lead frame housing 1224. In this way, the features of adjacent lead frame assemblies may interlock, holding the lead frame assemblies in a desired position with respect to each other. Such a configuration ensures that the lead frame assemblies 1212 and 1214 cannot move in the row direction with respect to each other.

The lead frame housing 1222 may include a feature 1410 on a side of the lead frame housing 1222. The lead frame housing 1224 may include a feature 1412 on a side of the lead frame housing 1224. The feature 1410 of the lead frame housing 1222 and the feature 1412 of the lead frame housing 1224 may be shaped to mate with each other such that the that the lead frame assemblies 1212 and 1214 cannot move with respect to each other, in a longitudinal direction perpendicular to the row direction. The lead frame housing 1224 may include latching features 1414. The connector housing 722 may include latching features inside the connector housing to engage with the latching features 1414 of the lead frame housing 1224 such that the lead frame assembly 1214 cannot move, with respect to the lead frame assembly 1212, in a transitional direction perpendicular to the row direction.

It should be appreciated that techniques of the lead frame assemblies 708, 710, 712, and 714 shown in FIG. 9A and techniques of the lead frame assemblies 1208, 1210, 1212, and 1214 shown in FIG. 12A may be used alone or in any suitable combination. The present disclosure should not be limited in these aspects.

The foregoing description of various embodiments are intended merely to be illustrative thereof and that other embodiments, modifications, and equivalents are within the scope of the invention recited in the claims appended hereto. For example, techniques as described herein may be used together, or in any combination, to provide connectors that pass high frequency signals, such as those above 40 Gbps using an NRZ protocol or greater than 50 Gbps using a PAM4 protocol. Connectors, for example, may pass signals at these frequencies with less than 6% near end and/or far end cross talk and/or less than −20 dB of attenuation. In other embodiments, however, the operating frequency range of the connector may be higher.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Various changes may be made to the illustrative structures shown and described herein. As a specific example of a possible variation, embodiments are described in which connections between a transceiver and a connector are electrical. Embodiments are possible in which the connections are optical.

Lossy material, such as lossy plastic, for example, may be molded over, plated on, adhered to or otherwise electrically coupled to the corrugated sheets and/or ground conductors.

Materials that dissipate a sufficient portion of the electromagnetic energy interacting with that material to appreciably impact the performance of a connector may be regarded as lossy. A meaningful impact results from attenuation over a frequency range of interest for a connector. In some configurations, lossy material may suppress resonances within ground structures of the connector and the frequency range of interest may include the natural frequency of the resonant structure, without the lossy material in place. In other configurations, the frequency range of interest may be all or part of the operating frequency range of the connector.

For testing whether a material is lossy, the material may be tested over a frequency range that may be smaller than or different from the frequency range of interest of the connector in which the material is used. For example, the test frequency range may extend from 10 GHz to 25 GHz. Alternatively, lossy material may be identified from measurements made at a single frequency, such as 15 GHz.

Loss may result from interaction of an electric field component of electromagnetic energy with the material, in which case the material may be termed electrically lossy. Alternatively or additionally, loss may result from interaction of a magnetic field component of the electromagnetic energy with the material, in which case the material may be termed magnetically lossy.

Electrically lossy materials can be formed from lossy dielectric and/or poorly conductive materials. Electrically lossy material can be formed from material traditionally regarded as dielectric materials, such as those that have an electric loss tangent greater than approximately 0.01, greater than 0.05, or between 0.01 and 0.2 in the frequency range of interest. The "electric loss tangent" is the ratio of the imaginary part to the real part of the complex electrical permittivity of the material.

Electrically lossy materials can also be formed from materials that are generally thought of as conductors, but are relatively poor conductors over the frequency range of interest. These materials may conduct, but with some loss, over the frequency range of interest such that the material conducts more poorly than a conductor of an electrical connector, but better than an insulator used in the connector. Such materials may contain conductive particles or regions that are sufficiently dispersed that they do not provide high conductivity or otherwise are prepared with properties that lead to a relatively weak bulk conductivity compared to a good conductor such as copper over the frequency range of interest. Die cast metals or poorly conductive metal alloys, for example, may provide sufficient loss in some configurations.

Electrically lossy materials of this type typically have a bulk conductivity of about 1 Siemen/meter to about 100,000 Siemens/meter, or about 1 Siemen/meter to about 30,000 Siemens/meter, or 1 Siemen/meter to about 10,000 Siemens/meter. In some embodiments, material with a bulk conductivity of between about 1 Siemens/meter and about 500 Siemens/meter may be used. As a specific example, material with a conductivity between about 50 Siemens/meter and 300 Siemens/meter may be used. However, it should be appreciated that the conductivity of the material may be selected empirically or through electrical simulation using known simulation tools to determine a conductivity that provides suitable signal integrity (SI) characteristics in a connector. The measured or simulated SI characteristics may be, for example, low cross talk in combination with a low signal path attenuation or insertion loss, or a low insertion loss deviation as a function of frequency.

It should also be appreciated that a lossy member need not have uniform properties over its entire volume. A lossy member, for example, may have an insulative skin or a conductive core, for example. A member may be identified as lossy if its properties on average in the regions that interact with electromagnetic energy sufficiently attenuate the electromagnetic energy.

In some embodiments, lossy material is formed by adding to a binder a filler that contains particles. In such an embodiment, a lossy member may be formed by molding or otherwise shaping the binder with filler into a desired form. The lossy material may be molded over and/or through openings in conductors, which may be ground conductors or shields of the connector. Molding lossy material over or through openings in a conductor may ensure intimate contact between the lossy material and the conductor, which may reduce the possibility that the conductor will support a resonance at a frequency of interest. This intimate contact may, but need not, result in an Ohmic contact between the lossy material and the conductor.

Alternatively or additionally, the lossy material may be molded over or injected into insulative material, or vice versa, such as in a two shot molding operation. The lossy material may press against or be positioned sufficiently near a ground conductor that there is appreciable coupling to a ground conductor. Intimate contact is not a requirement for electrical coupling between lossy material and a conductor, as sufficient electrical coupling, such as capacitive coupling, between a lossy member and a conductor may yield the desired result. For example, in some scenarios, 100 pF of coupling between a lossy member and a ground conductor may provide an appreciable impact on the suppression of resonance in the ground conductor. In other examples with frequencies in the range of approximately 10 GHz or higher, a reduction in the amount of electromagnetic energy in a conductor may be provided by sufficient capacitive coupling between a lossy material and the conductor with a mutual capacitance of at least about 0.005 pF, such as in a range between about 0.01 pF to about 100 pF, between about 0.01 pF to about 10 pF, or between about 0.01 pF to about 1 pF. To determine whether lossy material is coupled to a conductor, coupling may be measured at a test frequency, such as 15 GHz or over a test range, such as 10 GHz to 25 GHz.

To form an electrically lossy material, the filler may be conductive particles. Examples of conductive particles that may be used as a filler to form an electrically lossy material include carbon or graphite formed as fibers, flakes, nanoparticles, or other types of particles. Various forms of fiber, in woven or non-woven form, coated or non-coated may be used. Non-woven carbon fiber is one suitable material. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

While the above-described binder materials may be used to create an electrically lossy material by forming a binder around conducting particle fillers, lossy materials may be formed with other binders or in other ways. In some examples, conducting particles may be impregnated into a formed matrix material or may be coated onto a formed matrix material, such as by applying a conductive coating to a plastic component or a metal component. As used herein, the term “binder” encompasses a material that encapsulates the filler, is impregnated with the filler or otherwise serves as a substrate to hold the filler.

Magnetically lossy material can be formed, for example, from materials traditionally regarded as ferromagnetic materials, such as those that have a magnetic loss tangent greater than approximately 0.05 in the frequency range of interest. The “magnetic loss tangent” is the ratio of the imaginary part to the real part of the complex electrical permeability of the material. Materials with higher loss tangents may also be used.

In some embodiments, a magnetically lossy material may be formed of a binder or matrix material filled with particles that provide that layer with magnetically lossy characteristics. The magnetically lossy particles may be in any convenient form, such as flakes or fibers. Ferrites are common magnetically lossy materials. Materials such as magnesium ferrite, nickel ferrite, lithium ferrite, yttrium garnet or aluminum garnet may be used. Ferrites will generally have a loss tangent above 0.1 at the frequency range of interest. Presently preferred ferrite materials have a loss tangent between approximately 0.1 and 1.0 over the frequency range of 1 GHz to 3 GHz and more preferably a magnetic loss tangent above 0.5 over that frequency range.

Practical lossy magnetic materials or mixtures containing lossy magnetic materials may also exhibit useful amounts of dielectric loss or conductive loss effects over portions of the frequency range of interest. Suitable materials may be formed by adding fillers that produce magnetic loss to a binder, similar to the way that electrically lossy materials may be formed, as described above.

It is possible that a material may simultaneously be a lossy dielectric or a lossy conductor and a magnetically lossy material. Such materials may be formed, for example, by using magnetically lossy fillers that are partially conductive or by using a combination of magnetically lossy and electrically lossy fillers.

Lossy portions also may be formed in a number of ways. In some examples the binder material, with fillers, may be molded into a desired shape and then set in that shape. In other examples the binder material may be formed into a sheet or other shape, from which a lossy member of a desired shape may be cut. In some embodiments, a lossy portion may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, lossy portions may be formed by plating plastic or other insulative material with a lossy coating, such as a diffuse metal coating.

As another example of a variation, in some embodiments, contact tails were illustrated as surface mount elements. However, other configurations may also be used, such as press fit “eye of the needle” compliant sections that are designed to fit within vias of printed circuit boards, solderable pins, etc., as aspects of the present disclosure are not limited to the use of any particular mechanism for attaching connectors to printed circuit boards.

Further, a connector as illustrated herein is configured for mating with a transceiver according to an OSFP standard. Techniques as described herein may be used for connectors configured to operate with any SFP standards, such as QSFP-DD standard, or for other I/O connectors even if not specifically configured to operate in connection with an SFP standard. Moreover, techniques as described herein may be used for single port or stacked connectors. Moreover, one or more of the techniques described herein might be applied in connectors configured other than I/O connectors, such as backplane connectors.

For purposes of this patent application and any patent issuing thereon, the indefinite articles “a” and “an,” as used herein in the specification and in the claims, unless clearly indicated to the contrary, should be understood to mean “at least one.” The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified.

The use of “including,” “comprising,” “having,” “containing,” “involving,” and/or variations thereof herein, is meant to encompass the items listed thereafter and equivalents thereof as well as additional items.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. An assembly comprising:

a housing;

a plurality of conductive elements held by the housing in a row extending in a row direction, each conductive element comprising a mating contact portion, a mounting portion opposite the mating contact portion, and an intermediate portion extending between the mating contact portion and the mounting portion, each of the plurality of conductive elements comprising a length from the mating contact portion to the mounting portion; and one or more corrugated sheets comprising plateaus and valleys, wherein:

the plurality of conductive elements comprise signal conductive elements and ground conductive elements, the valleys of the one or more corrugated sheets are attached to the ground conductive elements, and for the signal conductive elements, the one or more corrugated sheets extend along at least 50% of the length of the signal conductive elements.

2. The assembly of claim 1, wherein:

the housing comprises a portion elongated in the row direction; and the one or more corrugated sheets comprises:

a first sheet portion disposed adjacent to a first side of the portion of the housing elongated in the row direction; and a second sheet portion disposed adjacent to a second side of the portion of the housing elongated in the row direction, the second side being opposite the first side.

3. The assembly of claim 2, wherein:

the portion of the housing elongated in the row has a width, in a direction perpendicular to the row direction, that is no more than 50% of the length of the intermediate portions of the conductive elements.

4. An assembly comprising:

a housing;

a plurality of conductive elements held by the housing in a row extending in a row direction, each conductive element comprising a mating contact portion, a mounting portion opposite the mating contact portion, and an intermediate portion extending between the mating contact portion and the mounting portion; and one or more corrugated sheets comprising plateaus and valleys, wherein:

the plurality of conductive elements comprise signal conductive elements and ground conductive elements, the valleys of the one or more corrugated sheets are attached to the ground conductive elements, the housing comprises a portion elongated in the row direction and a wider portion extending from the portion elongated in the row, the plurality of conductive elements comprise conductive elements held by the wider portion of the housing, and the conductive elements held by the wider portion of the housing are configured for power or lower frequency signals than the signal conductive elements.

5. The assembly of claim 1, wherein, for the signal conductive elements, the one or more corrugated sheets extend along 50% to 99% of the length of the signal conductive elements.

6. The assembly of claim 1, wherein:

the signal conductive elements and ground conductive elements are disposed in a repeating pattern, and the plateaus of the one or more corrugated sheets are aligned with signal conductive elements between two adjacent ground conductive elements.

7. The assembly of claim 1, wherein:

the one or more corrugated sheets have a thickness less than a thickness of the plurality of conductive elements.

8. The assembly of claim 1, wherein:

the one or more corrugated sheets are made of a material that is less conductive than a material of the plurality of conductive elements.

9. The assembly of claim 7, wherein:

the valleys of the one or more corrugated sheets are attached to the ground conductive elements via welds.

10. The assembly of claim 8, wherein:

the welds cover more than 50% of the length of the valleys.

11. The assembly of claim 1, wherein:

the valleys of the one or more corrugated sheets are attached to the ground conductive elements at line welds, and each line weld has an aspect ratio of length to width of more than 5:1.

12. An electrical connector comprising:

a first assembly comprising:

a first plurality of conductive elements each comprising a mating contact portion, a mounting portion opposite the mating contact portion, and an intermediate portion extending between the mating contact portion and the mounting portion;

one or more first corrugated sheets comprising plateaus and valleys, the valleys of the one or more first corrugated sheets attached to selected conductive elements of the first plurality; and a first housing holding the first plurality of conductive elements in a first row, the first housing comprising:

a plurality of first features aligned in a row direction parallel to the first row and protruding away from the one or more first corrugated sheets, the plurality of first features separated from each other by first gaps; and a plurality of tabs aligned in the row direction and protruding through at least one of the one or more first corrugated sheets.

13. The electrical connector of claim 12, comprising:

a second assembly stacked above the first assembly, the second assembly comprising:

a second plurality of conductive elements each comprising a mating contact portion, a mounting portion opposite the mating contact portion, and an intermediate portion extending between the mating contact portion and the mounting portion; and a second housing holding the second plurality of conductive elements in a second row, the second housing comprising a plurality of second features aligned parallel to the row direction and shaped to fit in the first gaps of the first housing such that the second assembly cannot move in the row direction with respect to the first assembly.

14. The electrical connector of claim 13, wherein:

the first housing of the first assembly comprises a third feature on a side of the first housing, the second housing of the second assembly comprises a fourth feature on a side of the second housing, and the third feature of the first housing and the fourth feature of the second housing are shaped to interlock such that the second assembly cannot move, with respect to the first assembly, in a longitudinal direction perpendicular to the row direction.

15. The electrical connector of claim 13, wherein:

the second housing of the second assembly comprises latching features, and the electrical connector comprises a connector housing comprising latching features inside the connector housing to engage with the latching features of the second housing of the second assembly such that the second assembly cannot move, with respect to the first assembly, in a transitional direction perpendicular to the row direction.

16. The electrical connector of claim 13, wherein:

the second assembly comprises one or more second corrugated sheets comprising plateaus and valleys, the valleys of the one or more second corrugated sheets attached to selected conductive elements of the second plurality, and the one or more second corrugated sheets are separated from the one or more first corrugate sheets by the first and second pluralities of conductive elements.

17. The electrical connector of claim 13, comprising:

a third assembly stacked above the second assembly, the third assembly comprising:

a third plurality of conductive elements each comprising a mating contact portion, a mounting portion opposite the mating contact portion, and an intermediate portion extending between the mating contact portion and the mounting portion, and a third housing holding the third plurality of conductive elements in a third row, the third housing comprising a plurality of fifth features aligned in the row direction, the plurality of fifth features separated from each other by second gaps.

18. An assembly comprising:

a housing comprising a first feature;

a plurality of conductive elements held by the housing in a row, each conductive element comprising a mating contact portion, a mounting portion opposite the mating contact portion, and an intermediate portion extending between the mating contact portion and the mounting portion, the plurality of conductive elements comprising signal conductive elements and ground conductive elements; and a plurality of corrugated sheets comprising plateaus and valleys, the plateaus disposed corresponding to the signal conductive elements of the plurality of conductive elements, the valleys disposed corresponding to the ground conductive elements of the plurality of conductive elements, the plurality of corrugated sheets comprising:

a first corrugated sheet disposed between distal ends of the mating contact portions of the plurality of conductive elements and the housing, and a second corrugated sheet comprising a second feature, the second feature engaged with the first feature of the housing.

19. The assembly of claim 18, wherein:

the first feature and the second feature are at a central portion of the housing and a central portion of the second corrugated sheet.

20. The assembly of claim 18, wherein, for the signal conductive elements, the plurality of corrugated sheets extend along 50% to 99% of a length of the signal conductive elements.

* * * * *